(12) United States Patent
Nagamura et al.

(10) Patent No.: US 6,895,397 B2
(45) Date of Patent: May 17, 2005

(54) KNOWLEDGE ANALYSIS SYSTEM, KNOWLEDGE ANALYSIS METHOD, AND KNOWLEDGE ANALYSIS PROGRAM PRODUCT

(75) Inventors: Eiji Nagamura, Hino (JP); Nobuaki Kondo, Kodaira (JP); Katsuhiko Takachio, Kokubunji (JP); Kazuhiko Atsumi, Akishima (JP); Junya Sasaki, Ome (JP); Kazunori Shimakawa, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 386 days.

(21) Appl. No.: 10/083,563

(22) Filed: Feb. 27, 2002

(65) Prior Publication Data

US 2003/0023600 A1 Jan. 30, 2003

(30) Foreign Application Priority Data

Jul. 30, 2001 (JP) .................................. 2001-229500

(51) Int. Cl.⁷ .......................... G06F 17/00; G06N 5/02
(52) U.S. Cl. .......................... 706/46; 706/50; 706/59
(58) Field of Search .......................... 706/46, 50, 59; 707/100

(56) References Cited

U.S. PATENT DOCUMENTS 6,651,058 B1 * 11/2003 Sundaresan et al. ........... 707/6
6,721,726 B1 * 4/2004 Swaminathan et al. ........ 707/3
6,727,927 B1 * 4/2004 Dempski et al. ............ 345/853
2001/0029322 A1 * 10/2001 Iliff ............................ 600/300
2003/0023600 A1 * 1/2003 Nagamura et al. ............ 707/10

OTHER PUBLICATIONS

Yukiteru Nozawa et al., "Toshiba Knowledge Management Solutions", Toshiba Review vol. 56, No. 5, May, 2001, pp 8–13.

* cited by examiner

*Primary Examiner*—Anthony Knight
*Assistant Examiner*—Joseph P. Hirl
(74) *Attorney, Agent, or Firm*—Finnegan, Henderson, Farabow, Garrett & Dunner, L.L.P.

(57) ABSTRACT

There is provided a knowledge analysis system configured to be connectable to plural client terminals via network, which supports analysis requested by each of client terminals to knowledge accumulated in knowledge database, comprising: access control means for conducting user authentication to the client terminal requesting for access for permitting knowledge analysis from the client terminal; and knowledge analysis means for clustering knowledge accumulated in the knowledge database to create cluster database in which each of the knowledge is classified into clusters defined based on category; wherein the knowledge analysis means has means for setting important words having priority in clustering at creation of the cluster database, and carries out clustering to create an axis of cluster on the basis of the important words.

12 Claims, 21 Drawing Sheets

Knowledge database : 6 cases | Select knowledge databases as analysis objectives | Select To analysis condition designation screen in FIG.7

| Objective | Knowledge database Comment The number of databases |
|---|---|
| ☑ | 10,000 cases database (No.1  10225 cases) |
| ☑ | XXnewspaper article (as of 1999  10000 cases) |
| ☐ | Faq2 (Faq2  1234 cases) |
| ☐ | MAGNIA_FAQ (MAGNIA_FAQ  5678 cases) |
| ☐ | Company information (collection of KYOCOS company information 555 cases) |
| ☐ | Support technical information (support technical information 4810 cases) |
| | ...... |

F I G. 6

| Analysis condition saving | Enter analysis condition name to save | Enter |
|---|---|---|

Analysis condition name: Market trend analysis results of 10000 cases db & XX newspaper articles (1996 to 2000)

Analysis objective period: January 1, 1966 to December 31, 2000

Focusing keyword: Tokyo  New York  London

Number of focusing cases: 1000 cases

Number of hierarchies: 2-class hierarchy

Maximum number of most significant clusters: 20 pieces

Overlap of sentence: Present

Important word: Market price  Market  Stocks  Securities  Pensions  Economy  Banks
Money interests  Currency Unnecessary word: Sports  Social issues  Accidents Synonymous word: NY = New York = NEW YORK;
●●● = ○○○ ;

↑ Saving analysis conditions

FIG. 8

| Analysis conditions reading : 4 cases in total | Select analysis conditions | Analysis conditions reading and to analysis condition designation screen in FIG.7 |
|---|---|---|
| | | Select |

| Objective | Analysis conditions | Date of creation |
|---|---|---|
| ⦿ | 10000 cases db & ××newspaper article market trend analysis results | 2001/01/01 00:23 |
| ○ | Setting for ◆◆◆ analysis of ▽▽▽ DB | 2001/02/02 09:20 |
| ○ | CCCC | 2001/03/03 18:00 |
| ○ | DDDD | 2001/04/01 22:00 |
| | ...... | |

F I G. 10

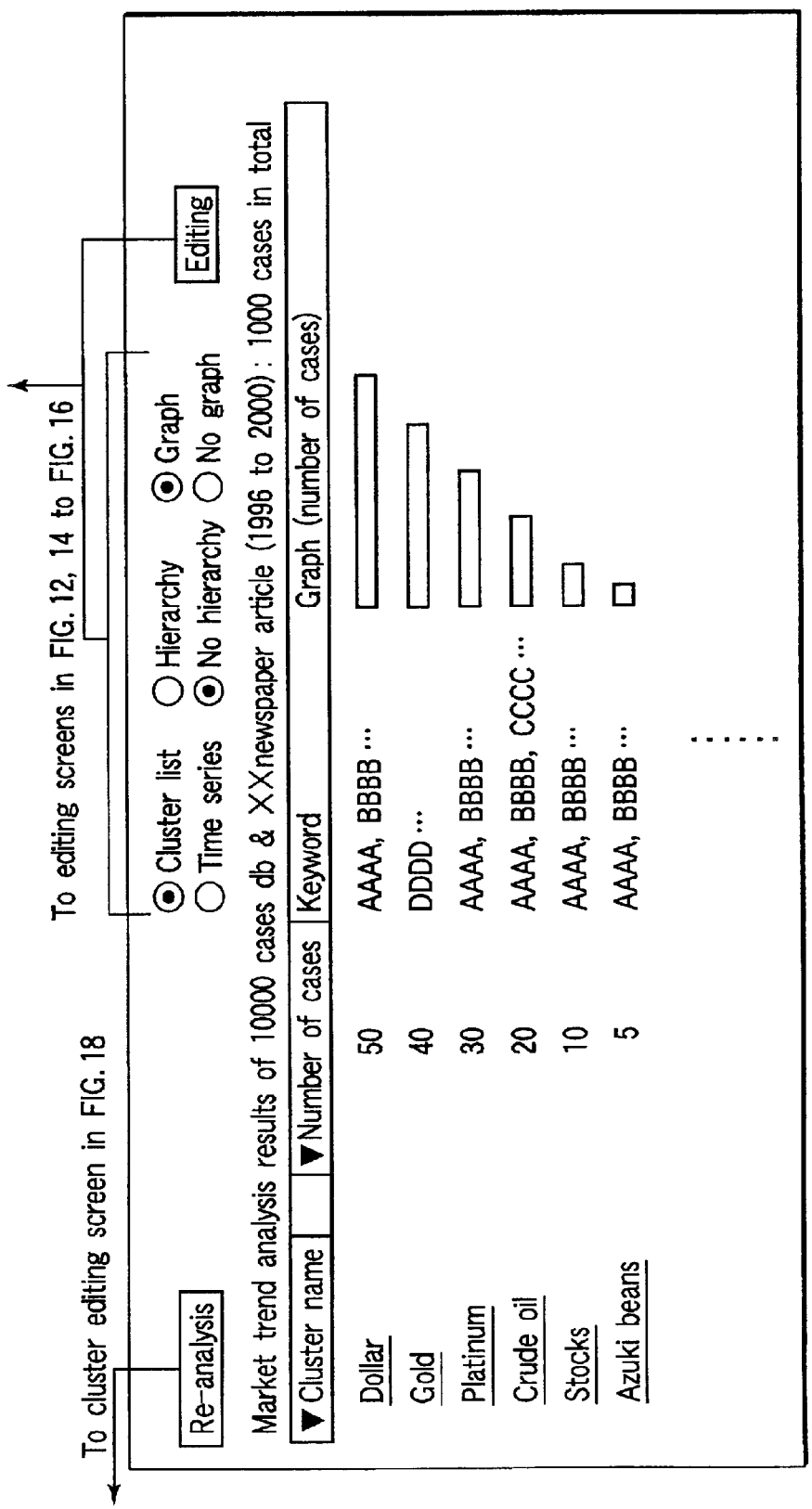
F I G. 13

| Fixed | Combination objective | | | |
|---|---|---|---|---|
| | | Hierarchy display | Cluster list display | Editing |
| | | Combination | Fixation | Fixation release | Re-alysis |
| | | Cluster (keyword) | | | Cases |
| — | □ | Market trend analysis results of 10000 cases db & XXnewspaper article (1996 to 2000) | | | 1000 |
| — | a | └ Tokyo | | | 450 |
| Fixed | b | └ New York | | | 350 |
| — | □ | ├ EE, FFFF ... | | | |
| — | □ | └ Market prices | | | 100 |
| — | □ | └ Dollar | | | 50 |
| Fixed | b | ├ GGGG, HHHH ... | | | |
| — | □ | └ III, JJJ ... | | | |
| Fixed | a | └ London | | | 150 |
| — | □ | └ Hong Kong | | | 30 |
| — | □ | aaaa, bb, cccc ... | | | |
| | | ●,XX,▼▼,◇◇◇ ... | | | 20 |
| | | └ Sudden fall | | | |
| | | &&,$$$$,%%%% ... | | | |

To re-analysis condition designation screen in FIG.19

F I G. 18

| Re-analysis condition designation | Input analysis conditions | Enter |
|---|---|---|

Re-analysis processing

Analysis objective DB : • 10000 cases db (No.1 10225 cases)  • XXnewspaper article (as of 1999 10000 cases)

Analysis result name : Market trend analysis results of 10000 cases db & XXnewspaper articles (1996 to 2000)

Analysis objective period : January 1, 1966 to December 31, 2000

Focusing keyword : Tokyo   New York   London

Number of focusing cases : 1000 cases

Number of hierarchies : 2-class layer

Overlap of knowledge : Present

Maximum number of most significant clusters : 30 pieces

Important word : Market price  Market  Stocks  Securities  Pensions  Economy  Banks
Money interests  Currency  Monetary relaxation  Bad loans Unnecessary word : Sports  Social issues  Accidents Synonymous word : NY = New York = NEW YORK;
●● = ○○○ ● ;

FIG. 19

KNOWLEDGE ANALYSIS SYSTEM, KNOWLEDGE ANALYSIS METHOD, AND KNOWLEDGE ANALYSIS PROGRAM PRODUCT

CROSS-REFERENCE TO RELATED APPLICATIONS

This application is based upon and claims the benefit of priority from the prior Japanese Patent Application No. 2001-229500, filed Jul. 30, 2001, the entire contents of which are incorporated herein by reference.

BACKGROUND OF THE INVENTION

1. Field of the Invention

The present invention relates to a knowledge analysis system, a knowledge analysis method, and a knowledge analysis program product to be used in knowledge management system.

2. Description of the Related Art

In recent years, introduction of groupware for sharing information among plural users is promoting mainly in companies. As representative forms of groupware, e-mail system, workflow system and the like are known. Lately, knowledge management system for sharing and supporting knowledge and information has become developed.

The knowledge management system has functions to accumulate and manage personal know-how in addition to Web information, electronic file information and so forth as knowledge database. By combination of these accumulation and management functions with retrieval functions such as natural language retrieval and the like, it is possible to utilize knowledge and information in more efficient manners.

While, in such a knowledge management system, it is important to design how to collect and accumulate knowledge pieces such as personal know-how and so forth. Knowledge pieces like personal know-how are what is implicit knowledge, and are not so formatted as Web information or electronic file information. Therefore, it is difficult to collect and accumulate the implicit knowledge in automatic manners.

Accordingly, in these days, there is a demand for the development of a knowledge management system that has knowledge accumulation supporting function. This knowledge accumulation supporting function is to automatically collect and accumulate knowledge like personal know-how and the like. By realizing the knowledge accumulation supporting function, it is possible to accumulate knowledge as implicit knowledge in the same manners as formatted explicit knowledge like Web information and electronic file information and so forth.

The development of a knowledge management system to easily retrieve such knowledge and information accumulated as mentioned above is also undergone in parallel. As its typical example, there is a natural language retrieval system including a knowledge retrieve supporting system to retrieve useful knowledge and information by entering an inquiry in natural language.

While, in this kind of knowledge management system, it is strongly required to systematize knowledge so as to promote to utilize knowledge data effectively. Systematization of knowledge includes, for example sorting out or browsing knowledge and information in simple and easy manners, presenting which kind of knowledge information may be retrieved to users who uses the system for the first time in easily understandable manners, and so forth. To these requirements, accumulated knowledge is classified through categorization and hierarchy and the like.

Classification of a large amount of accumulated knowledge is an extremely time-consuming task. Accordingly, it is preferable to automatically classify the knowledge by means of technologies, for instance, morphological analysis and the like. However, if the classification is automatically executed, categorization and hierarchy at the moment of classification will be affected greatly by inclination in the contents of knowledge groups accumulated at that moment. As a result, results have not always satisfied users, which has been a problem.

BRIEF SUMMARY OF THE INVENTION

According to one aspect of the present invention, there is provided a knowledge analysis system configured to be connectable to plural client terminals via network, which supports analysis requested by each of client terminals to knowledge accumulated in knowledge database, comprising: access control means for conducting user authentication to the client terminal requesting for access for permitting knowledge analysis from the client terminal; and knowledge analysis means for clustering knowledge accumulated in the knowledge database to create cluster database in which each of the knowledge is classified into clusters defined based on category; wherein the knowledge analysis means has means for setting important words having priority in clustering at creation of the cluster database, and carries out clustering to create an axis of cluster on the basis of the important words.

According to another aspect of the present invention, there is provided a knowledge analysis method for supporting analysis requested from each of client terminals to knowledge accumulated in knowledge database, comprising: conducting user authentication to client terminals requesting for access for permitting knowledge analysis from the client terminals; and clustering knowledge accumulated in the knowledge database to create cluster database in which each of the knowledge is classified into clusters defined based on category; wherein in the creation of the cluster database, important words having priority in clustering are set to create an axis of cluster on the basis of the important words.

According to further another aspect of the present invention, there is provided a knowledge analysis program product which supports for a computer system to analyze knowledge accumulated in knowledge database, comprising: a recording medium; a first program code which is recorded in the recording medium to assign the computer system a command to carry out user authentication to client terminals asking for access for permitting knowledge analysis from client terminals; a second program code which is recorded in the recording medium to assign the computer system a command to create cluster database used for knowledge analysis from each of client terminals whose access is permitted, for classifying each of knowledge accumulated in the knowledge database into clusters defined based on category; and a third program code which is recorded in the recording medium to assign the computer system a command to carry out analysis condition setting procedures to set important words having priority in clustering, unnecessary words to be ignored in clustering, and synonyms to be handled as synonymous words in clustering, at creation of the cluster database.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate present embodiment of the invention, and together with the general description given above and the detailed description of the embodiment given below, serve to explain the principles of the invention.

FIG. 6 is a diagram showing an example of a knowledge database selection screen according to the embodiment.

FIG. 8 is a diagram showing an example of an analysis condition saving screen according to the embodiment.

FIG. 10 is a diagram showing an example of an analysis condition reading screen according to the embodiment.

FIG. 13 is a diagram showing an example of a cluster list display screen (non hierarchy display & graph display) according to the embodiment.

FIG. 18 is a diagram showing an example of a cluster editing screen according to the embodiment.

FIG. 19 is a diagram showing an example of a reanalysis condition designation screen according to the embodiment.

DETAILED DESCRIPTION OF THE INVENTION

An embodiment of the present invention will be explained with reference to the drawings below.

<System Configuration>

Figure 1:
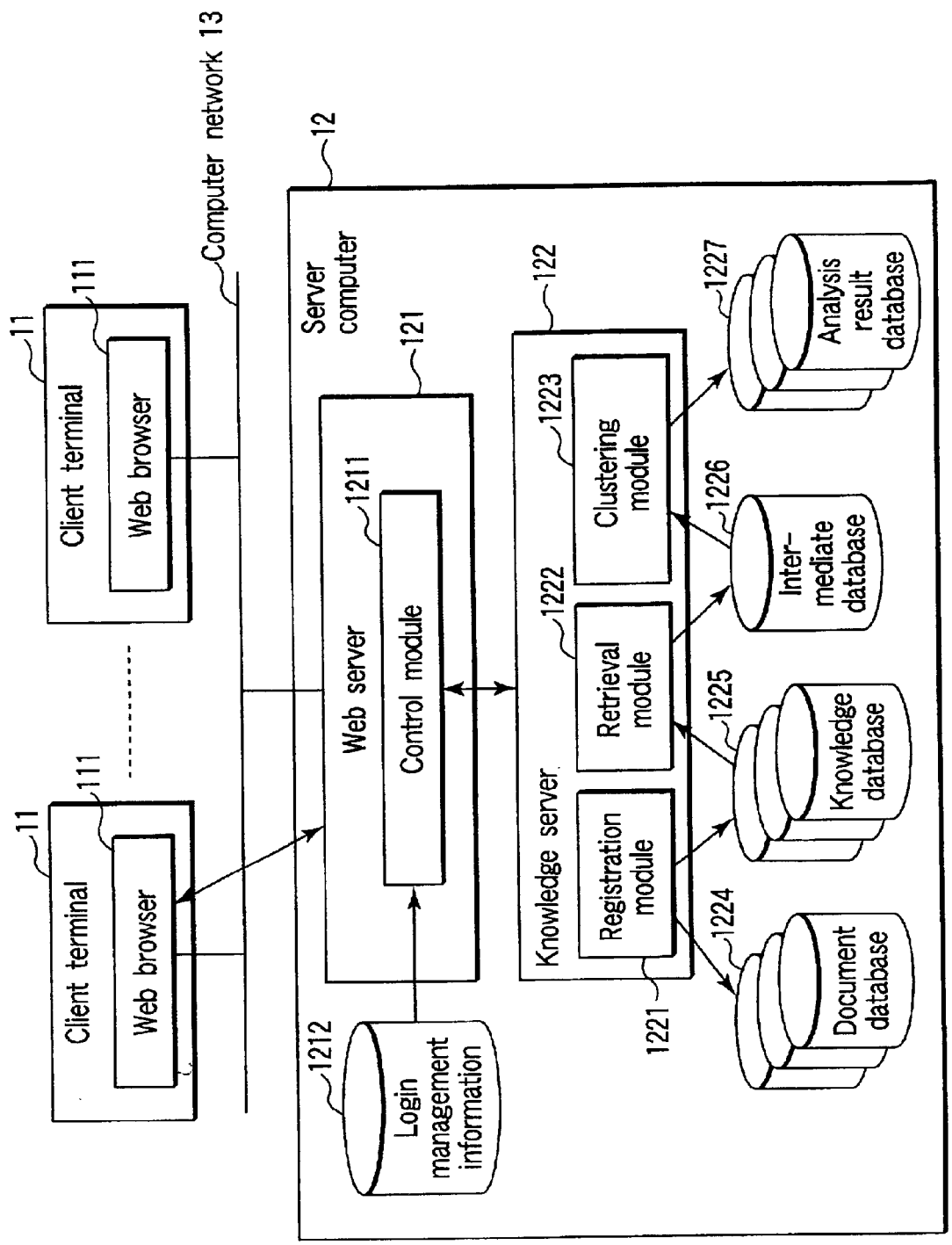
FIG. 1 is a block diagram showing a system configuration of a knowledge analysis system according to an embodiment of the present invention.

FIG. 1 is a block diagram showing a structure of a knowledge analysis system according to an embodiment of the present invention.

The knowledge analysis system according to the embodiment is realized by a plurality of client terminals 11 and a server computer 12. Each of the client terminals 11 and the server computer 12 may be connected with each other via a computer network 13 such as LAN (Local Area Network) and the like. The server computer 12 and each of the client terminals 11 have a CPU, a main memory, a magnetic disk device as a memory device, and an input and output device including an input portion such as a keyboard and a mouse and a output portion such as a display (not illustrated herein).

The client terminal 11 functions as Web browsers 111. For example, when a Web browser program memorized in the memory device of the client terminal 11 is readout by a CPU, Web browsing functions get started in the client terminal 11. An URL (Uniform Resource Locator) showing a resource for knowledge analysis configured on the server computer 12 is designated from the Web browser 111. Thereby, each client terminal 11 can use knowledge analysis processing.

The server computer 12 comprises a Web server 121, a knowledge server 122, and databases that are used in the respective servers 121 and 122.

The Web server 121 is equipped with a control module 1211. The knowledge server 122 comprises a registration module 1221, a retrieval module 1222 and a clustering module 1223.

The knowledge analysis function of the server computer 12 is realized mainly by software including the control module 1211, the registration module 1221, the retrieval module 1222 and the clustering module 1223, and management information and actual data used for knowledge analysis by these software pieces.

Management information is, for example, login management information 1212 for carrying out user authentication to each of client terminals 11. Actual data is, for example, document database (DB) 1224, knowledge database (DB) 1225, intermediate database (DB) 1226, and analysis result database (DB) 1227.

The control module 1211 controls the whole operations concerning knowledge analysis. The control module 1211 conducts intermediation processing between the knowledge server 122 and the Web server 121 as the core programs in the knowledge analysis system. The control module 1211 conducts user authentication processing when each client terminal 11 logs in the knowledge server 122 via the Web server 121.

The control module 1211 manages login management information 1212 for user authentication processing. This login management information 1212 contains user data including user ID and password and the like for each of users participating in the knowledge analysis system. By the user authentication processing, control of access permission or prohibition from each client terminal 11 to the knowledge server 122 is carried out.

The knowledge server 122 manages and operates the knowledge database 1225 and the analysis result database 1227 and the like which can be analyzed by plural client terminals 11. The knowledge server 122 classifies knowledge analysis results based on conditions designated from each client terminals 11 as knowledge clusters, and accumulates them into the analysis result database 1227.

Document files are memorized in the document database 1224. These document files include an electronic file including every kind of documents such as monographs, articles and the like. Morphological analysis is not carried out to the document files. Morphological analysis is a processing wherein for example character strings in documents are divided into appropriate word strings on the basis of dictionary information and grammar information.

Knowledge files are memorized in the knowledge database 1225. These knowledge files has, in a structured way, the following information pieces which are the results of morphological analysis of documents described in natural language (for instance, Japanese or English) and taken out from document files:

Morphologically analyzed words;
Word appearance frequency;
Information showing which words are included in each document.

These information pieces may be structured based on document, or may be structured for the whole of plural documents.

Intermediate files are memorized in the intermediate database 1226. The intermediate files are files comprising a set of word information pieces retrieved from one intermediate file or more by focusing conditions. The file structure of intermediate files is the same as that of knowledge files.

Analysis result files are memorized in the analysis result database 1227. The analysis result files are files wherein a tree structure of a keyword obtained by clustering intermediate files is specified.

The registration module 1221 creates knowledge files on the basis of document files stored in the document database 1224, and stores them into the knowledge database 1225. The retrieval module 1222 creates intermediate files on the basis of knowledge files stored in the knowledge database 1225, and stores them into the intermediate database 1226. The clustering module 1223 creates analysis result files on the basis of intermediate files stored in the intermediate database 1226, and stores them into the analysis result database 1227. Besides each of these modules 1221 to 1223 carries out knowledge analysis by use of the databases 1224 to 1227, and various data processing shown in the present embodiment. These details are described later herein.

The functions to be realized in the server computer 12, including the control module 1211, the registration module 1221, the retrieval module 1222, the clustering module 1223 and so forth in the server computer 12, are executed by reading out a program from the memory device arranged in the server computer 12.

Alternatively, the above functions may be executed by making a record medium reader arranged in the server computer 12 (not shown) read out a record medium wherein specified programs are recorded. The specified programs include a plurality of program codes for realizing the functions in the server computer 12, and each program code is recorded into the record medium.

<Functions of Knowledge Analysis System>

The knowledge analysis system of the present embodiment is a system which supports grasping tendencies that can be read from unsorted document groups collected for a certain purpose, i.e., knowledge groups, and so forth. This knowledge analysis system has the following three main functions:

(1) Automatic creation of knowledge clusters

Function to collect similar knowledge pieces and automatically sort them into knowledge clusters (knowledge groups) and edit them.

(2) Display of knowledge cluster list

Function to display the comparison of the numbers of knowledge pieces among sorted knowledge clusters.

(3) Display of time series graph of knowledge in knowledge clusters

Function to analyze and display the occurrence tendency of knowledge in a certain knowledge cluster.

By means of these functions (1) to (3), the knowledge analysis system may be utilized for the following applications:

Analysis on questionnaires and the like
Analysis on tendencies in questions to help desk
Classification of ideas
Analysis on well-selling products and their selling factors from business daily reports
Extraction of hottest topics from bulletin boards
Unexpected discoveries/new findings (creation of new knowledge)

The respective functions are explained hereinafter.

<Automatic Creation of Knowledge Clusters>

Figure 2:
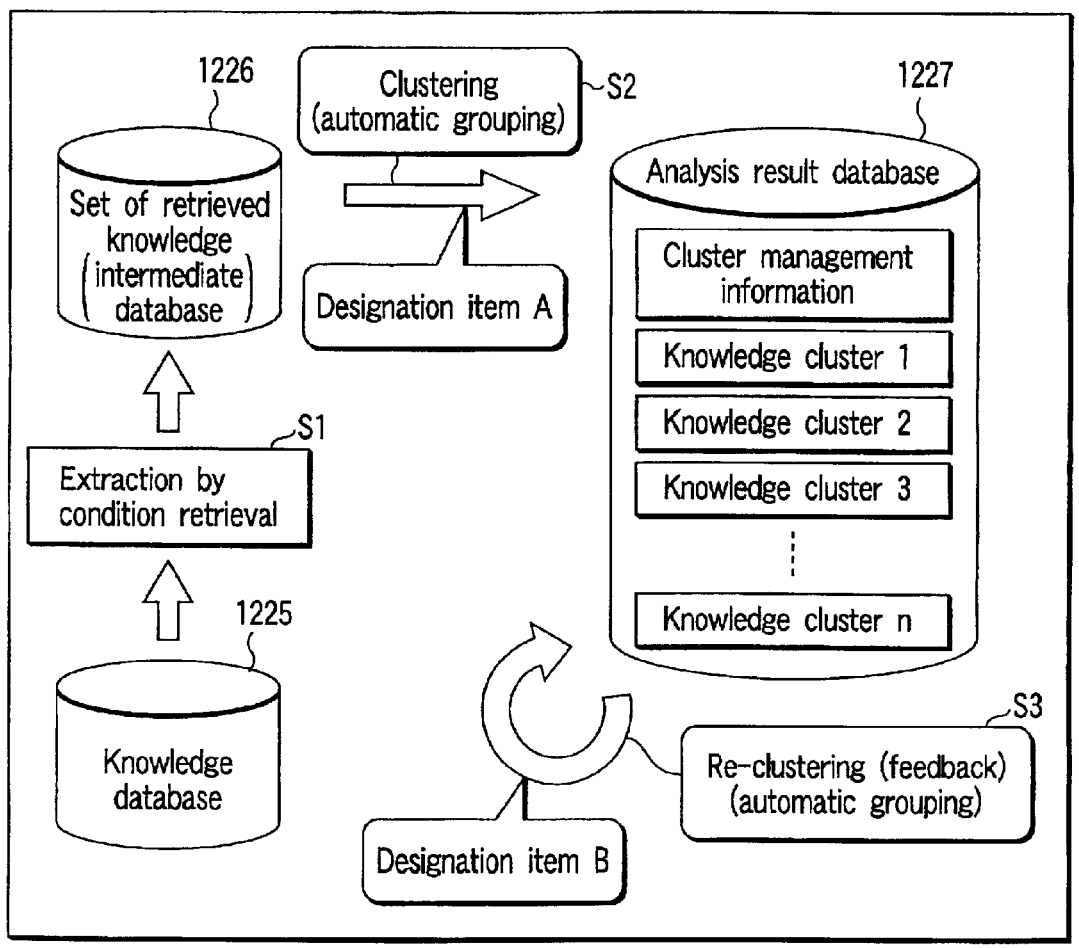
FIG. 2 is a diagram for explaining concept of automatically creating a knowledge cluster in the knowledge analysis system according to the embodiment.
Figure 3:
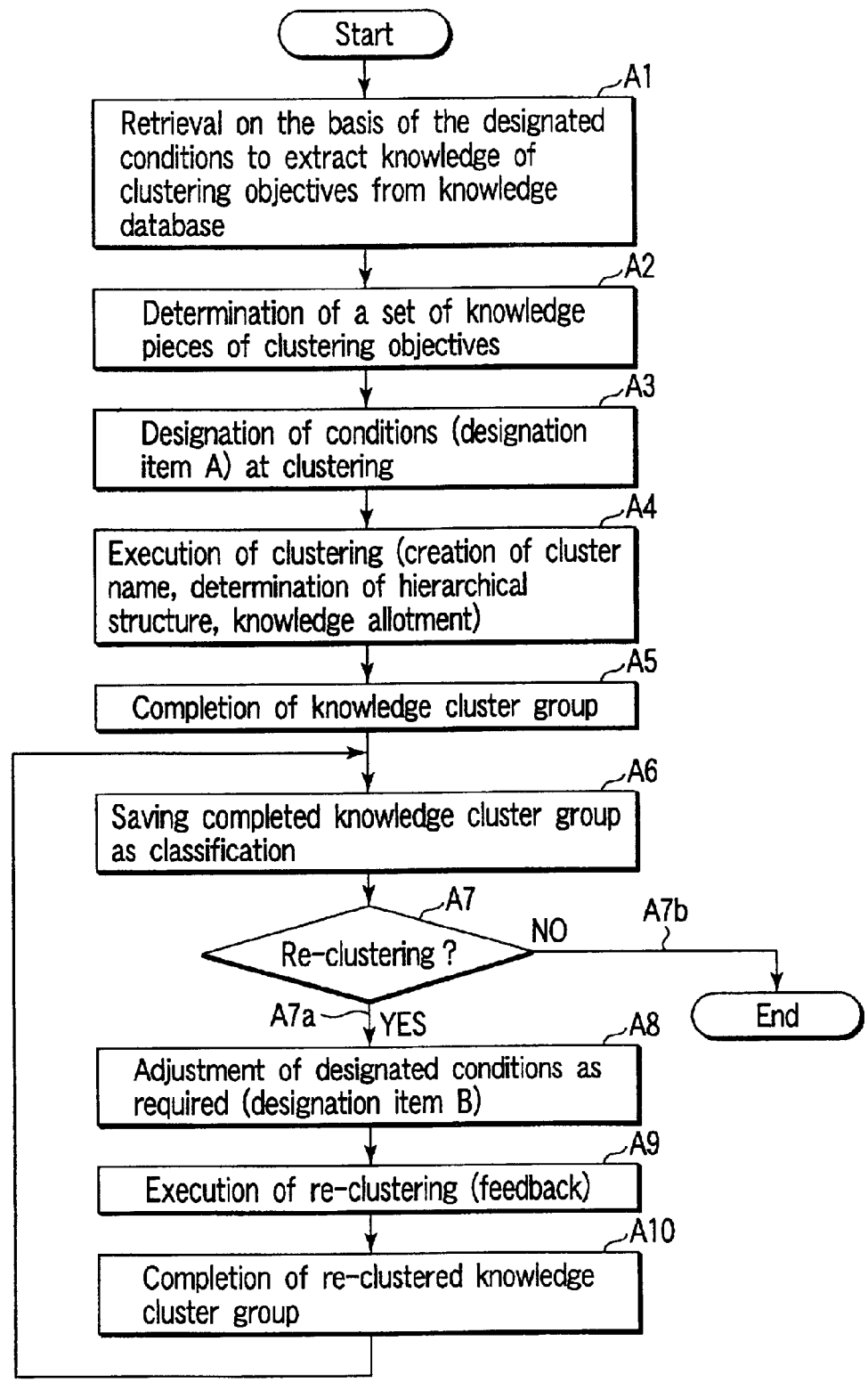
FIG. 3 is a flowchart showing the flow of clustering in the knowledge analysis system according to the embodiment.

FIG. 2 is a diagram showing a concept of automatic creation concept of a knowledge cluster. FIG. 3 is a flowchart showing the flow of the automatic creation shown in FIG. 2.

The automatic creation of knowledge clusters is the function to create knowledge clusters (knowledge groups) on the basis of a large amount of knowledge collected in databases in a knowledge management system. The creation of the knowledge clusters is executed by sorting knowledge pieces into groups including similar contents. Whether similar words are used or not is mainly referred to as a creation standard in the sorting. By the sorting, each cluster may be separated by hierarchy in which there is a cluster in another cluster. Further, knowledge cluster groups including the thus created plural knowledge clusters may be stored with name (classification name) as "classification".

As shown in FIG. 2, the automatic creation of knowledge clusters is realized mainly by three steps. The first step (s1) is an extraction step to the knowledge database 1225 by condition retrieval. By the step (s1), intermediate database 1226 is created. The second step (s2) is clustering step to the intermediate database 1226. By the step (s2), analysis result database 1227 is created. The third step (s3) is a re-clustering step to the analysis result database 1227. By the step (s3), the analysis result database 1227 is updated.

(1) Designation Items at Condition Retrieval in (s1)

As the designation items at retrieval, there are for example the two following items:

Retrieval condition: keyword retrieval
The number of knowledge pieces to be objectives of clustering (The number of retrieval scores from the top being used)

(2) Designation item A

In (s2), the designation item A to designate clustering conditions is designated.

In the designation item A, there are for example the nine following items:

Designation of important word/unnecessary word/synonymous word

Important word: Word considered to be important for analysis. The important word is given priority in clustering. The clustering is processed with the important word as axis of cluster. The axis of cluster means important knowledge for clusters, and with the axis as center, other knowledge pieces are added, thereby clusters are created.

Unnecessary word: Word unnecessary for analysis. The unnecessary word is ignored in clustering.

Synonymous word: Group of synonymous words in analysis. If one word is a synonymous word to another word, both the words are handled as an identical word in clustering.

The number of knowledge clusters to be created (first hierarchy).

Whether the number of hierarchy is specified as one or not specified.

Whether knowledge corresponds to one cluster (1 vs. 1) or plural (1 vs. n).

Whether a label comprises only noun or noun and other parts of speech.

The name of entire cluster (classification name).

(3) Designation Item B (Designation at re-clustering)

In (s3), the designation item B is designated for designating re-clustering conditions.

In the designation item B, there are for example the four following items:

Designation of fixed cluster (cluster not to be destructed even at re-clustering)

Designation of clusters to be integrated (2 words or more→1 word)

Designation of important word/unnecessary word

The number of knowledge clusters to be created (first hierarchy: the number of clusters created after re-clustering)

Next, the automatic creation processing of knowledge clusters is explained in reference to the flowchart in FIG. 3.

In the knowledge database 1225 in FIG. 2, a great number of knowledge pieces are stored without sequencing or sorting. A user designates conditions for extracting knowledge pieces to be clustering objectives from the knowledge database 1225. The retrieval module 1222 in the knowledge server 122 retrieves the knowledge database 1225 on the basis of the designated conditions (A1). By the retrieval, a set of retrieved knowledge pieces is determined (A2). The set of knowledge pieces determined in the manner is stored as an intermediate file into the intermediate database 1226. These steps (A1) and (A2) correspond to (s1) in FIG. 2.

Then, conditions for clustering is designated by a user as the designation item A(A3). The clustering module 1223 of the knowledge server 122 executes clustering (automatic grouping) on the basis of the designation item A. By the clustering, creation of cluster name, decision of hierarchy structure, and knowledge allotment processing are carried out (A4). Knowledge allotment herein means allotment of knowledge pieces to clusters. By the knowledge allotment processing, it is decided which knowledge piece should be classified and stored into which cluster. As a result, a knowledge cluster group comprising knowledge cluster 1 to knowledge cluster n in FIG. 2 is created. To the knowledge cluster group, cluster management information is added for managing knowledge cluster 1 to knowledge cluster n. Cluster management information includes, for example, a cluster name and the like. This knowledge cluster group is stored as an analysis result file into the analysis result database 1227 ((A5), (A6)). These steps (A3) to (A6) correspond to (s2) in FIG. 2.

When an end user wants to do clustering once again with different conditions (A7a), the user, as required, adjusts designation conditions (A8). The designation conditions are adjusted by entering the designation item B mentioned above. The cluster module 1223 of the knowledge server 122 executes re-clustering (referred to as feedback) on the basis of the entered designation item B (A9). Thereby, a re-clustered knowledge cluster group is created, and stored as an analysis result file into the analysis result database 1227 ((A10), (A6)). These steps (A8) to (A10) and (A6) correspond to (s3) in FIG. 2.

On the other hand, when re-clustering is not needed from the first, or when re-clustering is not needed any more (A7b), then, the clustering processing is ended.

Figure 20B:
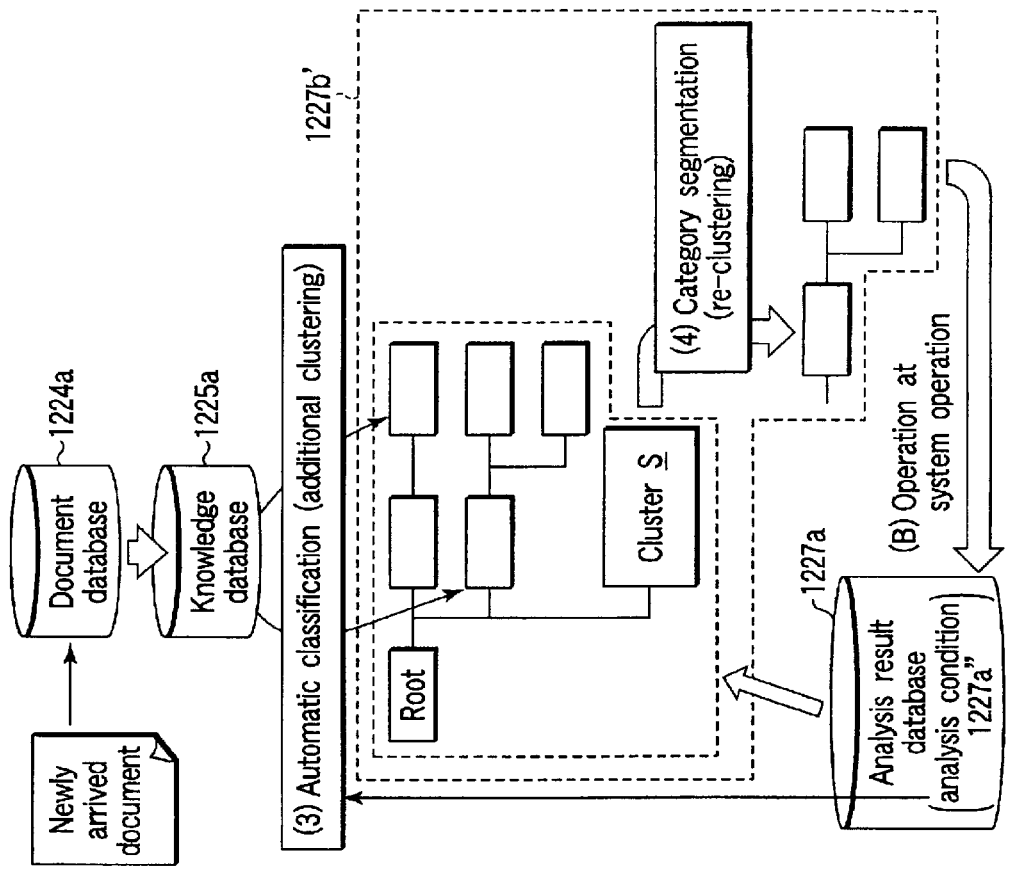
FIG. 20A and FIG. 20B are diagrams for explaining, in comparison, introduction and operation of the knowledge analysis system according to the embodiment.
Figure 20A:
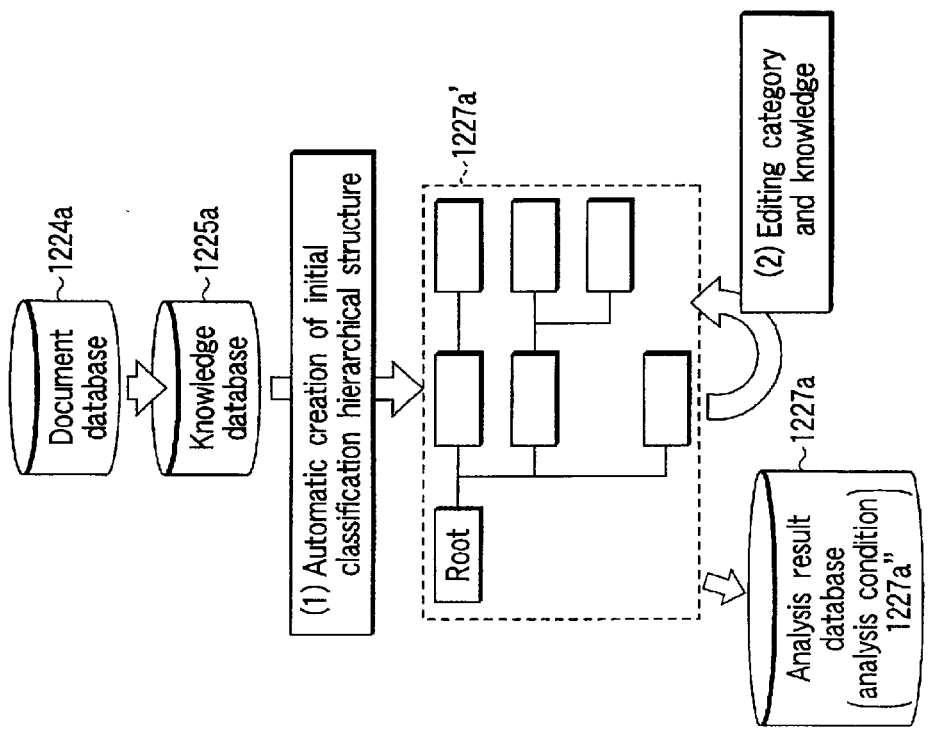

Having such a structure as mentioned above, the knowledge analysis system may create the process flow as shown in FIG. 20A and FIG. 20B easily.

FIG. 20A is a diagram showing an example of a process flow at system introduction, while FIG. 20B is a diagram showing an example of process flow at system operation. Each block connected to the root represents a cluster. Lines connecting each block show a hierarchical structure among clusters.

As shown in FIG. 20A, at system introduction, knowledge database 1225a is created first on the basis of document database 1224a. Thereafter, important words, unnecessary words, and synonymous words are set. Automatic creation (1) of an initial classification hierarchical structure is executed to the knowledge database 1225a by the clustering module 1223 on the basis of the important words, unnecessary words, and synonymous words. By the automatic creation (1), plural clusters, and cluster hierarchical structure 1227a' are specified. Thereafter, these important words, unnecessary words, and synonymous words are reset and re-clustering is carried out. In the re-clustering, editing category and knowledge (2) is executed repeatedly until it is complete. Thereby, nearly an ideal classification and knowledge hierarchical structure are realized. The edited (2) cluster hierarchical structure 1227a' is stored in the analysis result database 1227a. Analysis conditions 1227a" including setting of important words, unnecessary words, and synonymous words is also stored in the analysis result database 1227a.

For the case of system operation, a case wherein a newly-arrived document is to be registered is supposed herein. As shown in FIG. 20B, on the basis of the newly-arrived document, document database 1224b, which is different from a document database which has been created at system introduction, is created. Based on the document database 1224b, knowledge database 1225b is created in the same manner as at system introduction.

By use of analysis conditions 1227a" stored at system introduction, additional clustering (details will be described later herein) is executed for example periodically. Thereby, automatic classification (3) of newly-arrived document (knowledge) is executed. Specifically, knowledge included in a newly-arrived document is allotted to a cluster including a hierarchical structure of fixed knowledge, and new analysis results are accumulated into the existing analysis result database 1227a. In the additional clustering, the already-created knowledge clusters are not overwritten. The analysis results obtained by the additional clustering are stored separately from the analysis result database 1227a.

If required, in addition to the additional clustering, important words, unnecessary words, and synonymous words are reset and re-clustering is carried out.

In FIG. 20B, other clusters than one (cluster s) of clusters set at system introduction are fixed. Category subdivision is carried out to the cluster s, thereby the re-clustering is made. By the re-clustering, it is possible to set the already-created knowledge hierarchical structure more deeply. In the example in FIG. 20B, the hierarchical structure which was 2-story layer at introduction has become 3-story layer. Of course, by not fixing other clusters than the clusters to be objectives of re-clustering, but by making them objectives of clustering, it is possible to reorganize other clusters. Clusters and cluster hierarchical structure 1227b' obtained by re-clustering are replaced and stored into the already created analysis result database 1227a.

As mentioned above, the knowledge analysis system can make both operations at system introduction and system operation greatly efficient.

<Operations of Knowledge Analysis System>

Figure 21:
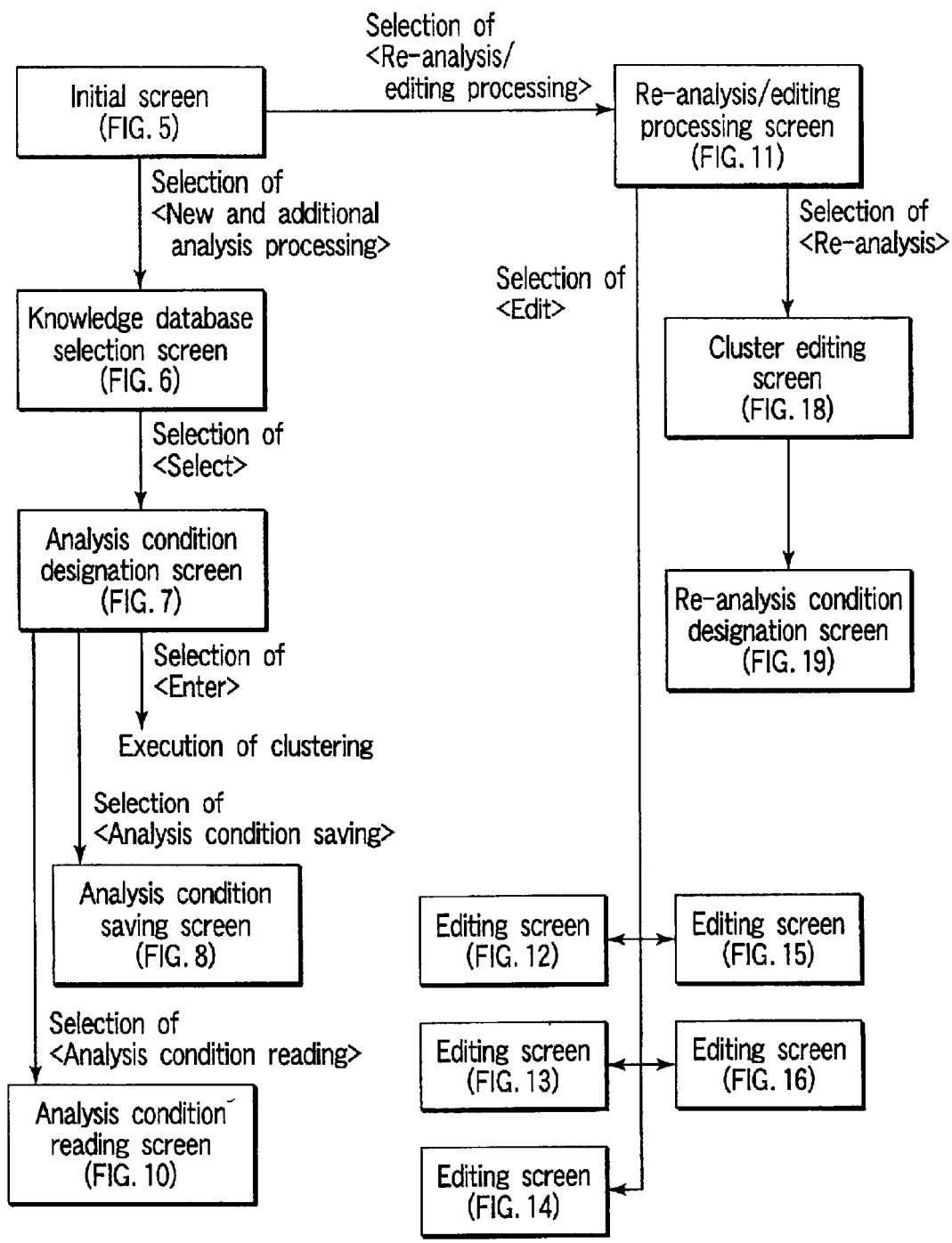
FIG. 21 is a diagram showing transitions of display screens of the knowledge analysis system according to the embodiment.

Next, details as to how to use the knowledge analysis system shown in FIG. 1 are explained in reference to transition diagram of display screens shown in FIG. 21. In FIG. 21, each block represents a display screen that is displayed on a display device of a client terminal 11, while an arrow mark represents transitions. Meanwhile, the transitions of arrow marks are reversible, and when transition from one screen to another screen is illustrated, then its reverse transition may be available.

There are three representative use methods of knowledge analysis system. Specifically, they include new analysis processing method, additional analysis processing method, and re-analysis processing method.

New analysis (new clustering) processing method is a method for carrying out clustering so as to create knowledge cluster groups newly from the knowledge database 1225.

Additional analysis (additional clustering) processing method is a method for carrying out further clustering on the basis of the already-created knowledge cluster groups. In the additional analysis processing, already-created knowledge clusters are not overwritten. A cluster different from already-created knowledge is newly created. Re-analysis processing method is a method for carrying out re-clustering on the basis of the already-created knowledge cluster groups, and for replacing existing cluster with a new cluster.

<New Analysis Processing Method>

Figure 4:
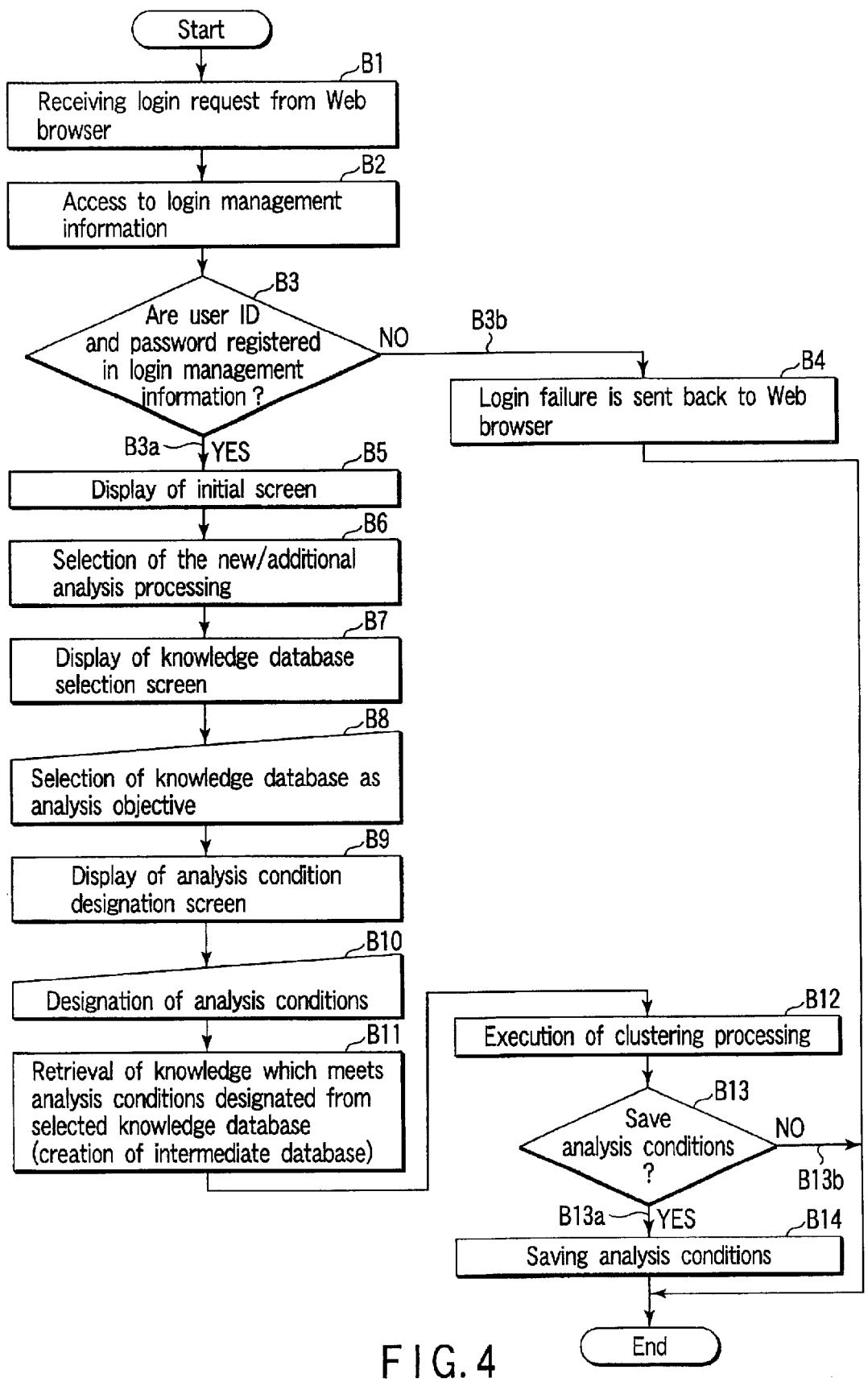
FIG. 4 is a flowchart showing procedures of a new analysis processing method according to the embodiment.

In reference to the flowchart in FIG. 4, new analysis processing method is explained hereinafter. In the new analysis processing method, knowledge analysis processing is executed on the basis of analysis conditions designated by a user. Analysis conditions designated at that moment are saved. Analysis conditions include important words, unnecessary words, and synonymous words designated by a user.

First, a user requests login to the control module 1211 of the server computer 12 via Web browser 111 (B1). In response to the login request, the control module 1211 accesses the login management information 1212, and checks whether or not the user ID and password input and sent by the user are registered therein (B2). User authentication is carried out 1211 for determining whether or not the login is permitted (B3). If the user ID and password are not registered in the login management information 1212, it is determined that the login is not accepted. In this case, the login fails (B3b). As a result, the control module 1211 sends out data showing that the login has failed via the Web server 121 to the Web browser 111 and ends the processing (B4).

On the other hand, if the user ID and password are already registered in the login management information 1212, and the login succeeds (B3a), the clustering module 1223 of the knowledge server 122 sends an initial screen file to the client terminal 11. The Web browser 111 displays the initial screen on the display device of the client terminal 11 on the basis of the initial screen file (B5).

Figure 5:
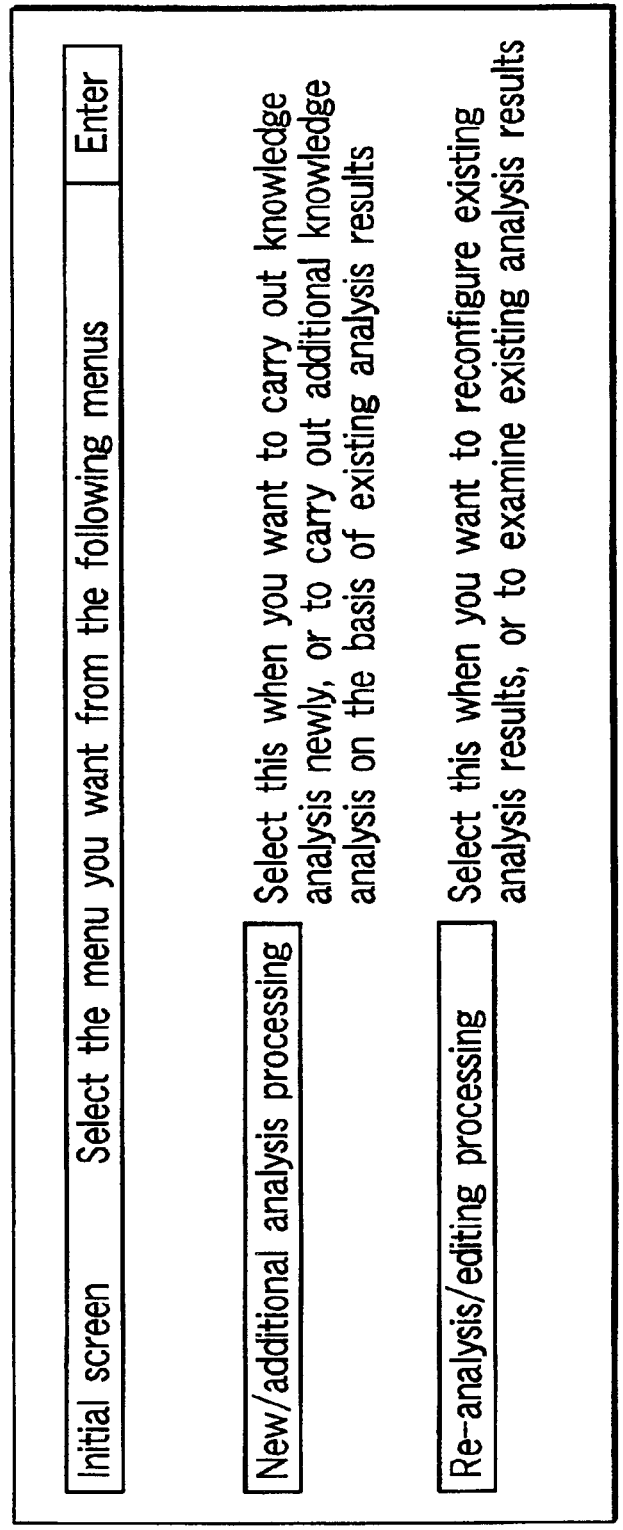
FIG. 5 is a diagram showing an example of an initial screen according to the embodiment.

FIG. 5 is a diagram showing an example of an initial screen. In the initial screen, there is an item for selection of either "New and additional analysis processing" menu or "Re-analysis/editing processing" menu. In the initial screen, the user selects the selection item of the new and additional analysis processing (B6). When the selection item is chosen, the Web browser 111 asks for new and additional analysis processing to the server computer 12. In response to the processing request, the clustering module 1223 sends a knowledge database selection screen file to the client terminal 11. The Web browser 111 of the client terminal 11 makes the display device to display knowledge database selection screen on the basis of the received knowledge database selection screen file (B7).

FIG. 6 is a diagram showing an example of a knowledge database selection screen. In FIG. 6, the following items are displayed:

Knowledge DB (comment/number of cases): Name, comment and number of cases of knowledge database 1225.

The knowledge database 1225 is arranged at one-to-one basis with the document database 1224. This knowledge database 1225 stores an index of documents to be accumulated in the document database 1224, i.e., words included in knowledge.

The knowledge database 1225 is generated by the following steps.

When the client terminal 11 requests to store a document to either of document database 1224, the registration module 1221 of the knowledge server 122 stores the document into the designated document database 1224. At the storage, the registration module 1221 conducts for example morphological analysis on the contents of the document, and creates an index of words contained in the document. The registration module 1221 stores the created index into the knowledge database 1225.

When the knowledge database selection screen is displayed, a user is prompted to select the knowledge database 1225. The user then selects the knowledge database 1225 as analysis objective on the knowledge database selection screen (B8). One analysis objective or plural analysis objectives may be selected. FIG. 6 shows an example wherein two knowledge databases 1225 of "ten thousand cases db" and "xx newspaper articles" are selected. For example, when analysis objectives are checked, and <Selection> is selected, the analysis objective identification data for identifying the selected analysis objectives is sent to the server computer 12.

Meanwhile, in the following embodiments, "selection of < >" means selecting an icon or the similar displayed on the screen by means of an input device (for instance, by clicking the mouse button). Of course, the operation "selecting an icon displayed on the screen" may be replaced by "entry of preset data by means of a keyboard and the like (using a shortcut)".

The clustering module 1223 of the knowledge server 122 creates an analysis condition designation screen file which includes information concerning the selected analysis objectives, on the basis of the received analysis objective identification data. Then, the clustering module 1223 sends the analysis condition designation screen file to the client terminal 11. The Web browser 111 makes a display device display the analysis condition designation screen on the basis of the received analysis condition designation screen file (B9).

Figure 7:
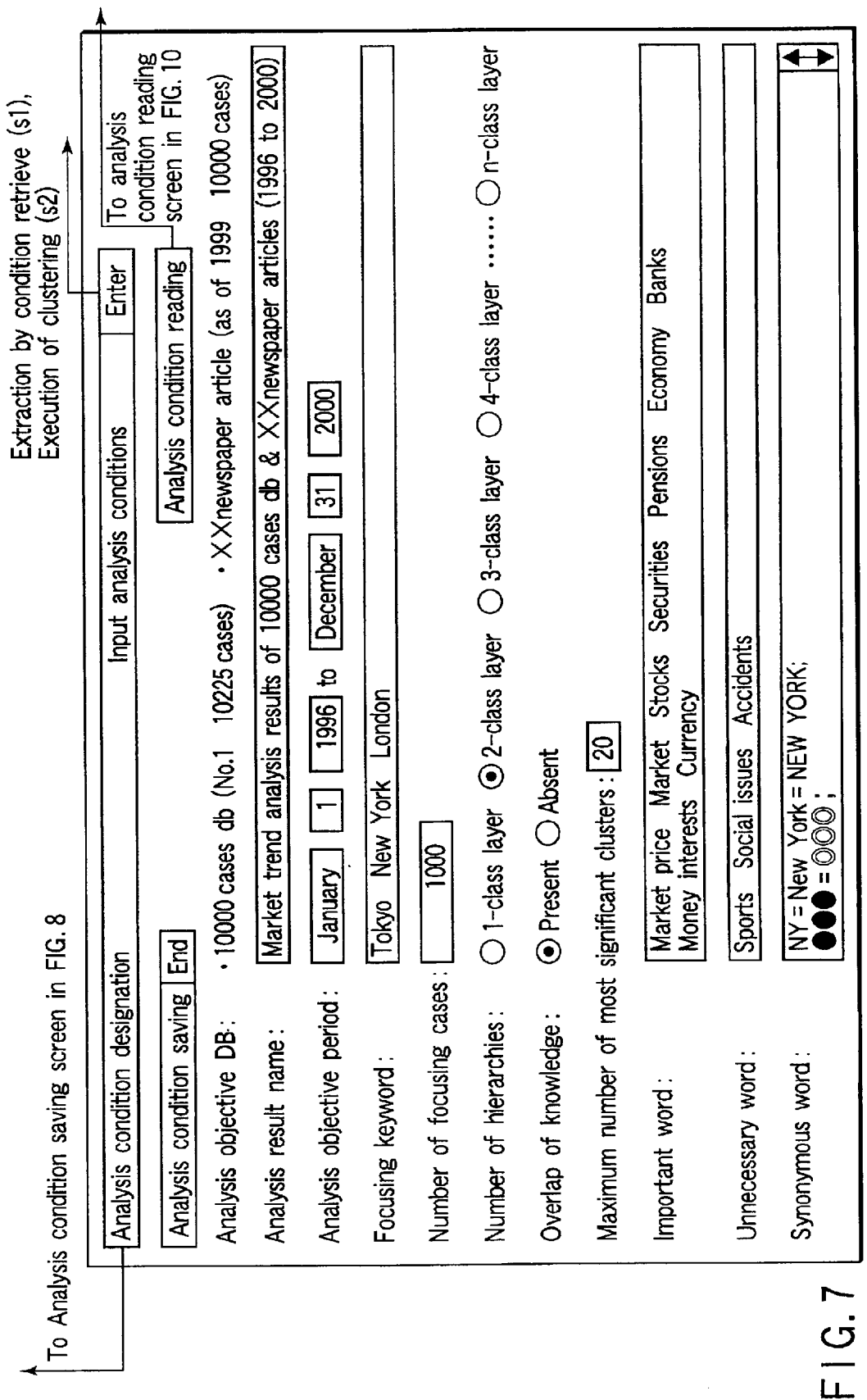
FIG. 7 is a diagram showing an example of an analysis condition designation screen according to the embodiment.

FIG. 7 is a diagram showing an example of an analysis condition designation screen. FIG. 7 shows the screen for designating conditions to analyze the knowledge databases 1225 selected in the knowledge database selection screen. On the analysis condition designation screen, the following items are displayed:

Analysis objective DB: All the names of knowledge data, comments, and numbers of cases selected on the knowledge database selection screen in FIG. 6 are displayed.

Analysis result name: A name at saving an analysis result is entered. If the name is identical with an already-saved analysis result name, a warning message is displayed at selection of <Enter>, and if <Save> in the massage is selected, the data is saved by overwriting on the already-created analysis result.

Analysis objective period: A period to be analysis objective is entered. In the case of no entry, all the knowledge pieces become analysis objectives.

Focusing keyword: A word to be an analysis keyword is entered. In the case of no entry, all the knowledge pieces become analysis objectives.

Number of focusing cases: The maximum number of cases to be registered in analysis result is entered. When the number of analysis results exceeds the number of analysis cases, a specified number of knowledge pieces with higher matching degree with analysis conditions are extracted. In the case of no entry, all the knowledge pieces become analysis objectives.

Number of hierarchies: The number of hierarchies for clustering is designated. If in default, it is set at for example "n hierarchy". In this case, there is no limit in the number of hierarchies.

Overlap of knowledge: By the overlap of knowledge, it is designated whether to permit one knowledge piece to be registered in plural clusters in redundancy or not. If "Yes" is selected, each knowledge piece is registered into all the relating clusters. As a result, identical knowledge pieces exist in other plural clusters. Accordingly, the total of analysis results may exceed the sum of the total of analysis source databases. On the other hand, if "No" is selected, each knowledge piece is registered into only one cluster having the most-related connection. If in default, it is "Yes".

Maximum number of most significant clusters: The maximum number of clusters to be created in the most significant cluster is designated herein. In the case of no entry, clustering is carried out with no designation.

Important word: An important word for analysis is entered. In the case of entering plural words, space between words is made.

Unnecessary word: An unnecessary word for analysis is entered. In the case of entering plural words, space between words is made.

Synonymous word: A synonymous word for analysis is entered. Synonyms are entered with "=" in between them. Defined synonyms are separated with each other by semicolon (;). Three synonyms or more may be defined for one item. Defined synonyms are collected into the word which is described at the most left (head) in analysis result.

Among the designation items shown above, analysis objective DB, analysis result name, analysis objective period, focusing keyword, and number of focusing cases are conditions to be used in the retrieval shown in (s1) in FIG. 2. The number of hierarchies, overlap of knowledge, maximum number of most significant cluster, important word, unnecessary word, and synonymous word correspond to the designation item A shown in (s2) in FIG. 2. The important word, unnecessary word, and synonymous word may be used as conditions for the retrieval in (s1). Therefore, when analysis conditions are designated on the analysis condition designation screen, both the conditions for creating the intermediate database 1226 from the knowledge database 1225, and the conditions for creating the analysis result database 1227 from the intermediate database 1226 are set.

The user designates analysis conditions on the analysis condition designation screen, and selects <Enter> (B10). By the selection of <Enter>, the Web browser 111 sends analysis condition data to the server computer 12. The analysis conditions designated on the analysis condition designation screen are specified by the analysis condition data. When the analysis condition data is received, the retrieval module 1222 of the knowledge server 122 carries out retrieval on the knowledge databases 1225 selected on the knowledge database selection screen by use of the important word, unnecessary word, and synonymous word designated on the analysis condition data, and thereby creates intermediate database 1226 (B11).

Next, the clustering module 1223 of the knowledge server 122 carries out clustering processing on the basis of the analysis condition data (B12). The clustering processing result is automatically stored as knowledge cluster group into the analysis result database 1227.

Thereafter, when <Save analysis conditions> is selected on the analysis condition designation screen (B13a), the analysis condition saving screen is displayed.

FIG. 8 is a diagram showing an example of an analysis condition saving screen. As shown in FIG. 8, the analysis condition saving screen is displayed for saving the analysis conditions of the knowledge databases 1225 designated in FIG. 7. In the analysis condition saving screen, the following item is displayed.

Analysis condition name: All the analysis conditions

When <Enter> is selected in the analysis condition saving screen shown in FIG. 8, the analysis conditions are saved in relation with the analysis result into the analysis result database 1227 (B14). Meanwhile, by selecting <Save analysis conditions> on the analysis condition designation screen in FIG. 7, analysis conditions may be saved. In this case, there is no need to display the analysis condition saving screen in FIG. 8.

When analysis conditions are saved, the new analysis processing is complete. On the other hand, when analysis conditions are not saved, <End> on the analysis condition designation screen is selected (B13b). Thereby, the new analysis processing is complete.

<Additional Analysis Processing Method>

Figure 9:
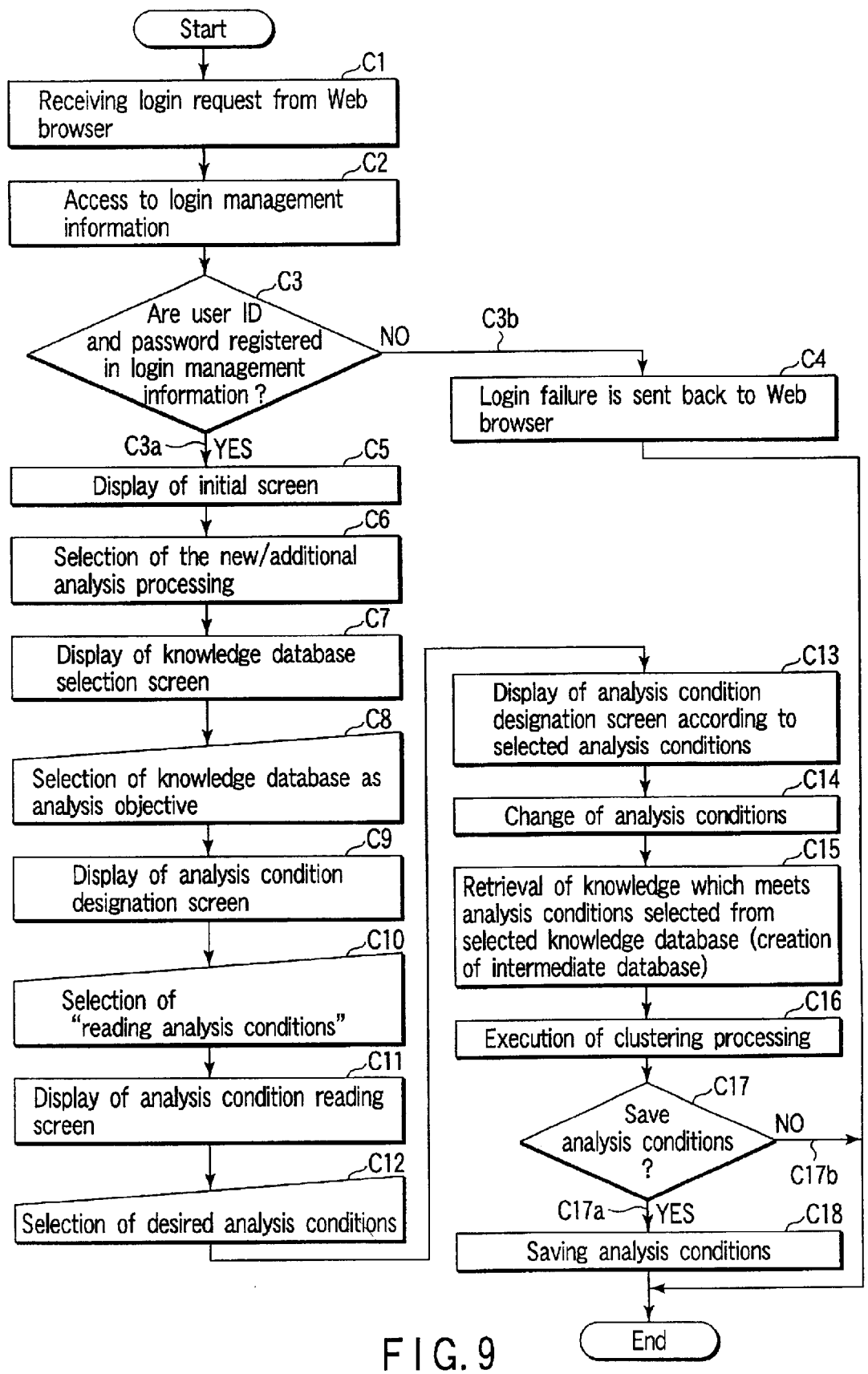
FIG. 9 is a flowchart showing procedures of an additional analysis processing method according to the embodiment.

Next, in reference to the flowchart in FIG. 9, additional analysis processing method is explained hereinafter.

The user requests login to the control module 1211 of the server computer 12 through the Web browser 111 (C1). In response to the login request, the control module 1211 accesses the login management information 1212 (C2), and carries out user authentication for determining whether or not the login is permitted (C3). If the user ID and password are not registered in the login management information 1212, it is determined the login is not accepted. In this case, the login fails (C3b). As a result, the control module 1211 sends out data showing that the login has failed via the Web server 121 to the Web browser 111 and ends the process (C4).

On the other hand, if the user ID and password are already registered in the login management information 1212, it is determined that authentication is accepted. As a result, the login succeeds (C3a). The clustering module 1223 of the knowledge server 122 first makes the display device of the client terminal 11 display the initial screen (C5). The initial screen is the same as that, in FIG. 5, explained in the new analysis processing. In the initial screen, user selects the new analysis processing (C6). In response to the item selection, the clustering module 1223 makes the display device of the client terminal 11 display the knowledge database selection screen (C7). The knowledge database selection screen herein is the same as that, in FIG. 6, explained in the new analysis processing. The user then selects the knowledge database 1225 as analysis objective on the knowledge database selection screen (C8). At the selection, the clustering module 1223 of the knowledge server 122 makes the display device of the client terminal 11 display the analysis condition designation screen concerning the selected analysis conditions (C9). The analysis condition designation screen herein is the same as that, in FIG. 7, explained in the new analysis processing.

These processes (C1) to (C9) are common with those (B1) to (B9) in the new analysis processing.

The user selects <Reading analysis conditions> on the analysis condition designation screen (C10). By the selection, the request for reading analysis conditions is made from the Web browser 111 to the server computer 12. In response to the analysis condition reading, the clustering module 1223 of the knowledge server 122 creates an analysis condition reading screen file, and sends it to the client terminal 11. The Web browser 111 makes the display device display the analysis condition reading screen on the basis of the received analysis condition reading screen file (C11).

FIG. 10 is a diagram showing an example of an analysis condition reading screen. This analysis condition reading screen is displayed for reading the analysis conditions of the knowledge database 1225 saved in FIG. 8. In FIG. 10, the following items are displayed:

Analysis condition name

Date and time of creation

The user selects analysis conditions to be used in the additional analysis processing, from the respective analysis conditions displayed in the analysis condition reading screen, and selects <Select> (C12). When the <Select> is selected, the Web browser 111 sends the analysis condition identification data to identify the analysis conditions selected by the user to the server computer 12, and requests to send the analysis condition data. At the request for sending, the clustering module 1223 of the knowledge server 122 sends the analysis condition data concerning the analysis conditions identified by the received analysis condition identification data to the client terminal 11.

The Web browser 111 makes the display device of the client terminal 11 display the analysis condition designation screen shown in FIG. 7 on the basis of the received analysis condition data (C13). The user may designate analysis conditions on the analysis condition designation screen in the same manner as in the new analysis processing (B10). What is different from (B10) is that in the additional analysis processing, the already-saved analysis conditions are read, and the analysis conditions are displayed on the analysis condition designation screen. In order to add analysis conditions without updating the already-saved analysis conditions, the user changes its analysis result name. Thereby, the existing analysis results may be left intact, and further additional analysis result may be obtained as a separate file.

When the already-saved analysis conditions are changed, analysis items may be changed. When analysis conditions are changed in this manner, and <Enter> is selected (C14), the Web browser 111 sends the changed analysis condition data to the server computer 12. The retrieval module 1222 of the knowledge server 122 carries out retrieval using important words, unnecessary words, and synonymous words designated on the analysis condition designation screen, from the knowledge database 1225 selected on the knowledge database selection screen, on the basis of the received analysis condition data, and creates intermediate database 1226 (C15). When analysis conditions are not changed in (C14), then (C15) is executed on the basis of the already-saved analysis conditions.

Next, the clustering module 1223 of the knowledge server 122 carries out clustering processing on the basis of the analysis conditions designated on the analysis condition designation screen (C16). Meanwhile, in the clustering processing by reading the analysis conditions, already-created clusters are not overwritten, instead, different clusters are newly created. Therefore, analysis result name is changed after being read.

Thereafter, when <Saving analysis conditions> is selected on the analysis condition designation screen (B17a), the analysis condition saving screen is displayed. The analysis condition saving screen herein is the same as that in FIG. 8 of the new analysis processing. When <Enter> is selected on the analysis condition saving screen shown in FIG. 8, the analysis conditions are saved in relation with the analysis results into the analysis result database 1227 (C18). When the analysis conditions are saved, the additional analysis processing is complete. On the other hand, when analysis conditions are saved, <End> on the analysis condition designation screen is selected (C17b). Thereby, the additional analysis processing is complete.

<Knowledge Cluster List Display Function>

Next, knowledge cluster list display function is explained hereinafter. When "Re-analysis/editing processing" is selected by a user on the initial screen shown in FIG. 5, the Web browser 111 makes a request for re-analysis/editing processing to the server computer 12. In response to the processing request, the clustering module 1223 creates a reanalysis/editing processing screen file, and sends it to the client terminal 11. The Web browser 111 of the client terminal 11 makes the display device display the re-analysis/editing processing screen on the received re-analysis/editing processing screen file.

Figure 11:
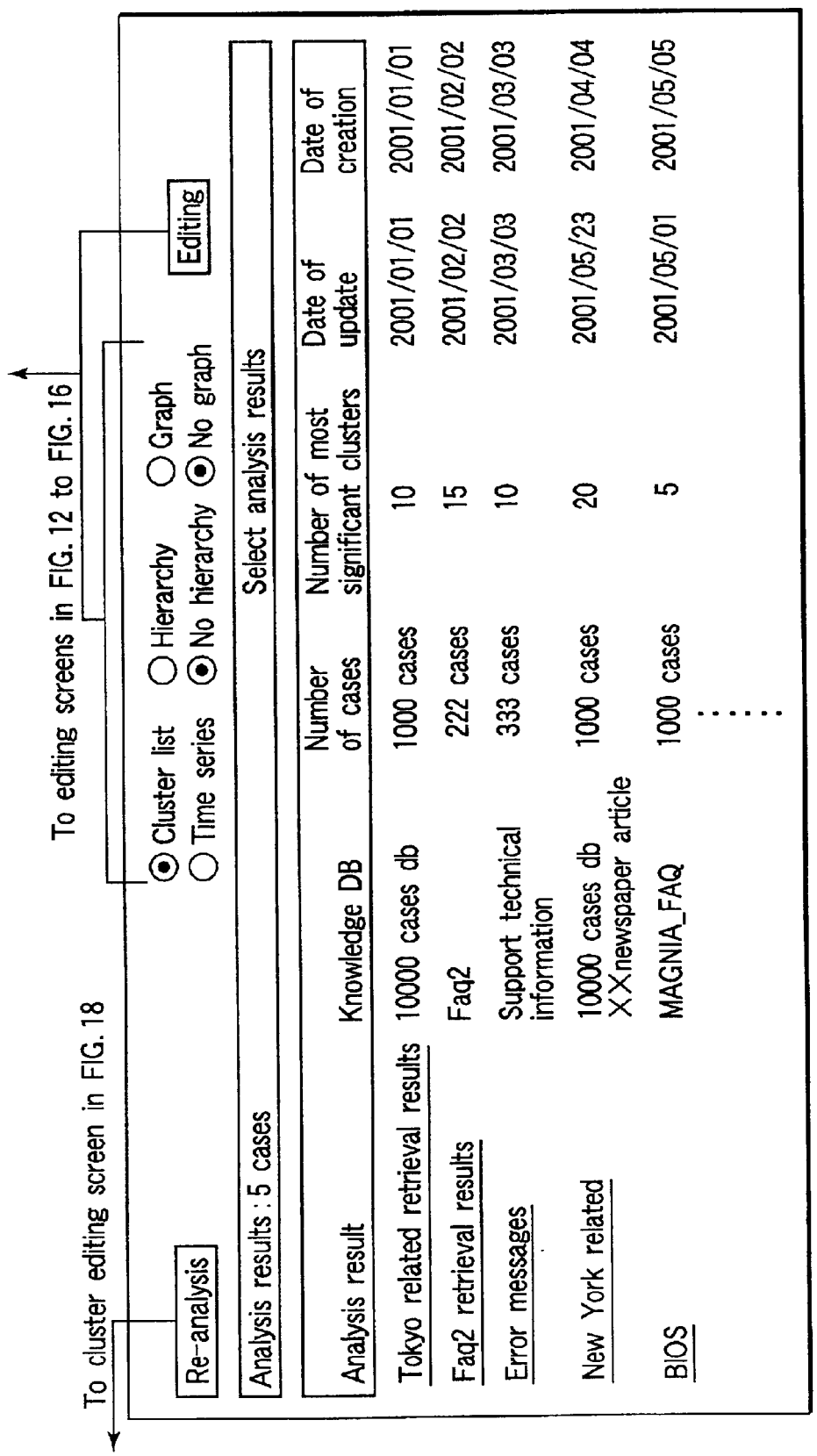
FIG. 11 is a diagram showing an example of a reanalysis/editing processing screen according to the embodiment.

FIG. 11 is a diagram showing an example of a reanalysis/editing processing screen. This FIG. 11 is an initial screen of knowledge analysis function. Results of the new analysis processing in FIG. 4 and the additional analysis processing in FIG. 9 (collection of knowledge clusters) are stored as classification into the analysis result database 1227. The list of the stored classification is displayed on the reanalysis/editing screen. Explanations on the screen are made hereinafter.

Analysis result: The name of an analyzed result is displayed. The analyzed result is designated by a user at creation of the analysis result.

Knowledge DB: The name of knowledge database used in analysis is displayed.

Number of cases: The total number of analyzed databases is displayed.

Number of most significant clusters: The number of clusters at the first hierarchy is displayed.

Date of update: The date when analysis results are updated last is displayed.

Date of creation: The date of creation of analysis results is displayed.

On the re-analysis/editing screen, there are <Re-analysis> button and <Edit> button arranged. When <Re-analysis> is selected, re-analysis processing to be described later herein is executed. When <Edit> is selected, editing processing for viewing details of analysis result is executed. By selecting classification from the screen of FIG. 11, a list of clusters in the classification may be viewed. New creation may be made from the screen. At the start of knowledge analysis function, the screen of FIG. 11 is displayed, to become the screen for selecting analysis results. On the re-analysis/editing screen, editing conditions in editing processing may be set. Specifically, it is possible to carry out selection of cluster list display or time series display, selection of hierarchy display or non hierarchy display, and selection of graph display or non graph display.

When the editing condition is selected and <Edit> is selected, an editing screen by respective editing conditions is displayed. The editing screens are shown in FIG. 12 to FIG. 16. When <Re-analysis> is selected in the editing screens shown in these FIG. 12 through FIG. 16, re-analysis processing to be described later herein may be executed. Specifically, when <Re-analysis> is selected, the cluster editing screen in FIG. 18 is displayed.

Editing processing, according to the knowledge analysis system in FIG. 1, is executed in the following steps.

When <Edit> is selected in FIG. 11, the Web browser 111 sends the selected editing conditions as editing condition data to the server computer 12, and requests for carrying out editing processing. The clustering module 1223 of the knowledge server 122 creates an editing screen file according to the editing conditions, on the basis of the received editing condition data, and sends it to the client terminal 11. The Web browser 111 of the client terminal 11 makes the display device display the editing screen on the basis of the received editing screen file. When <Edit> shown in FIG. 12 to FIG. 16 is selected, the same processing is carried out in FIG. 12.

In the case of the steps shown above, every time when editing conditions are changed, data communication must be made between the client terminal 11 and the server computer 12. Alternatively, an editing processing program arranged at the clustering module 1223 may be arranged at the client terminal 11. In this case, editing processing is executed at the client terminal 11, and the editing screen is displayed on the display device of the client terminal 11. Thereby, there is no need for data communication with the server computer 12 every time to change editing conditions. In this case, the analysis result database 1227 necessary for creation of editing screen by editing processing should be arranged at the client terminal 11 side.

Figure 14:
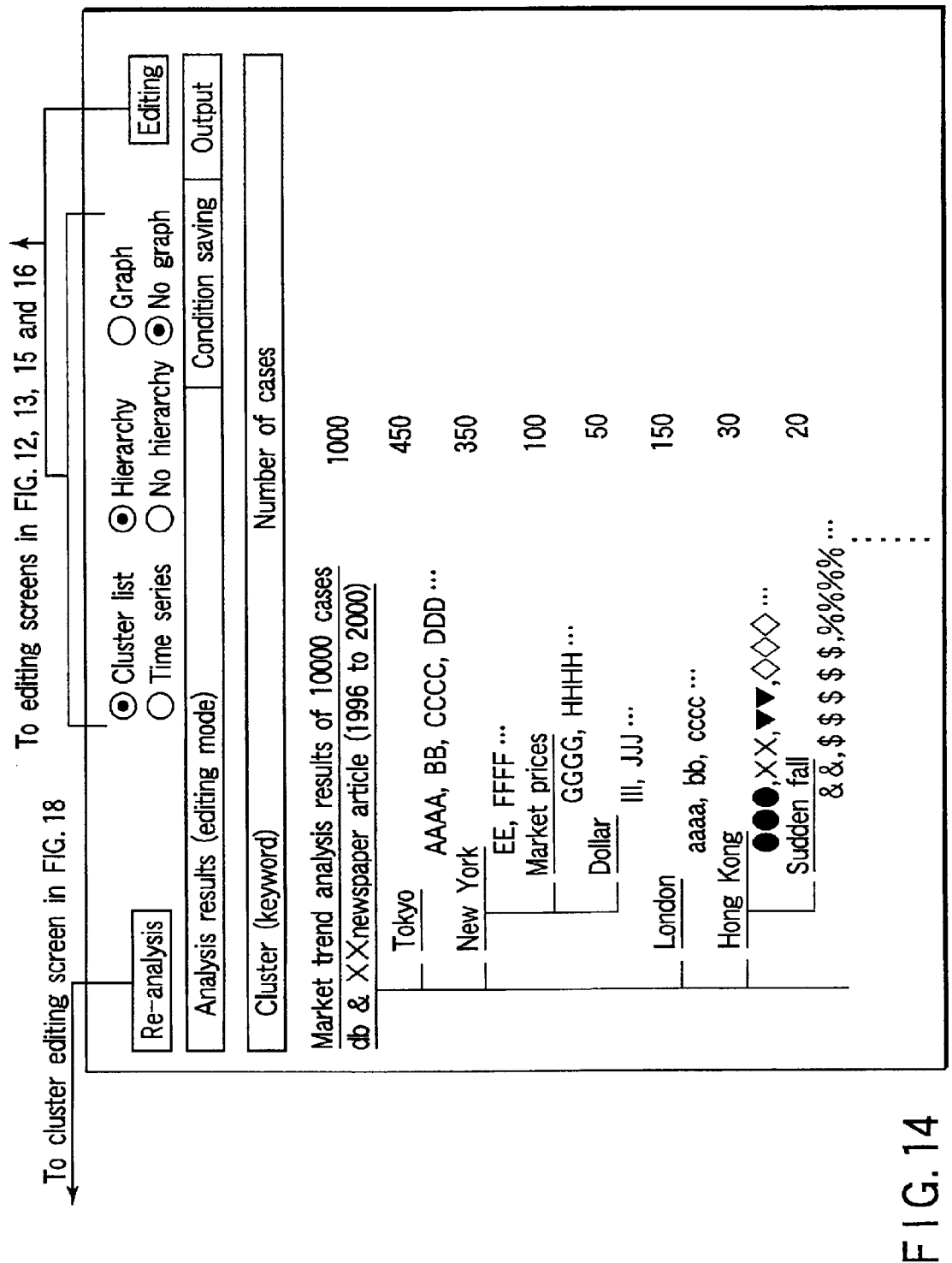
FIG. 14 is a diagram showing an example of a whole cluster hierarchy relation display screen (hierarchy display & non graph display) according to the embodiment.
Figure 15:
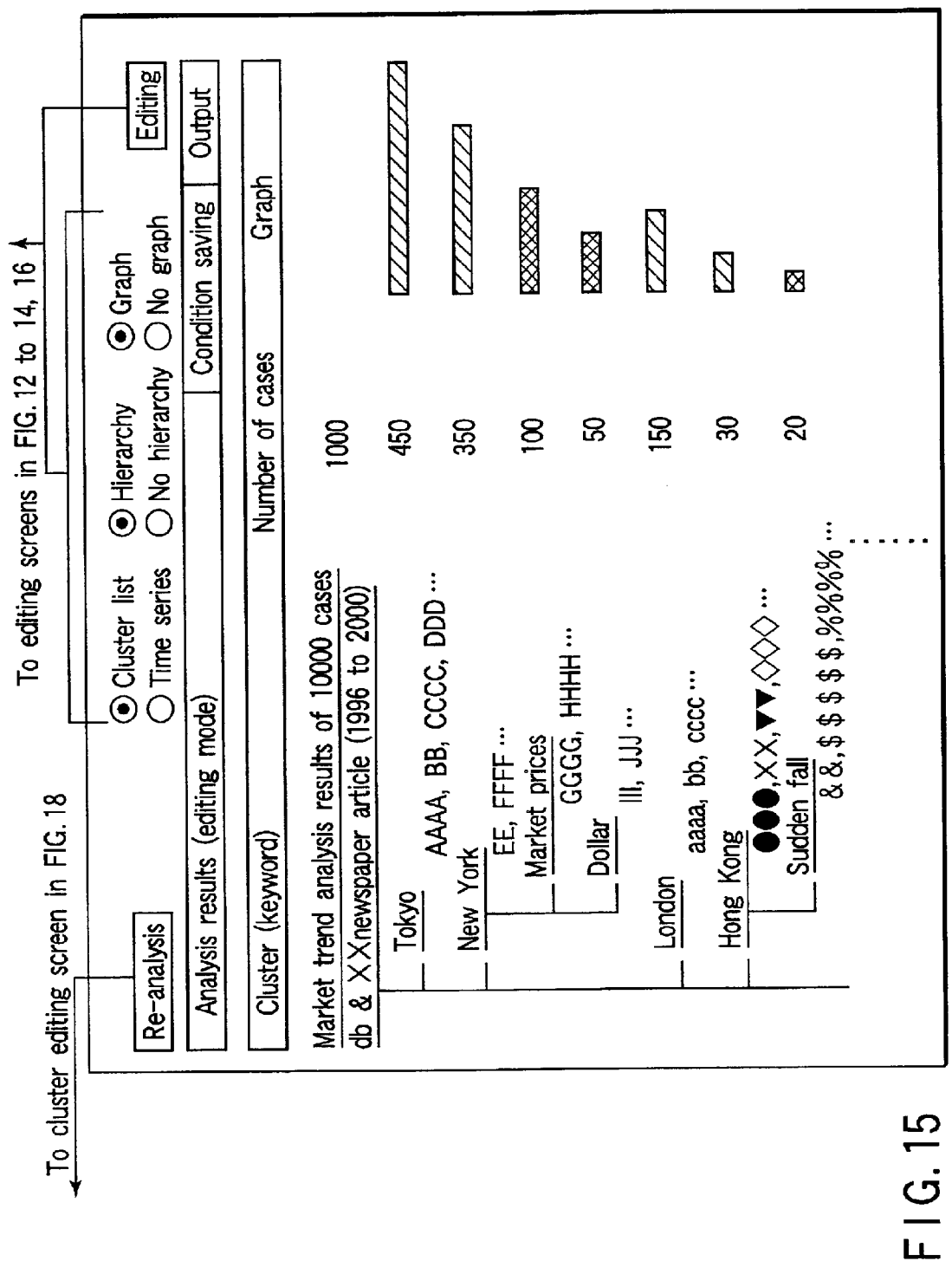
FIG. 15 is a diagram showing an example of a whole cluster hierarchy relation display screen (hierarchy display & graph display) according to the embodiment.
Figure 16:
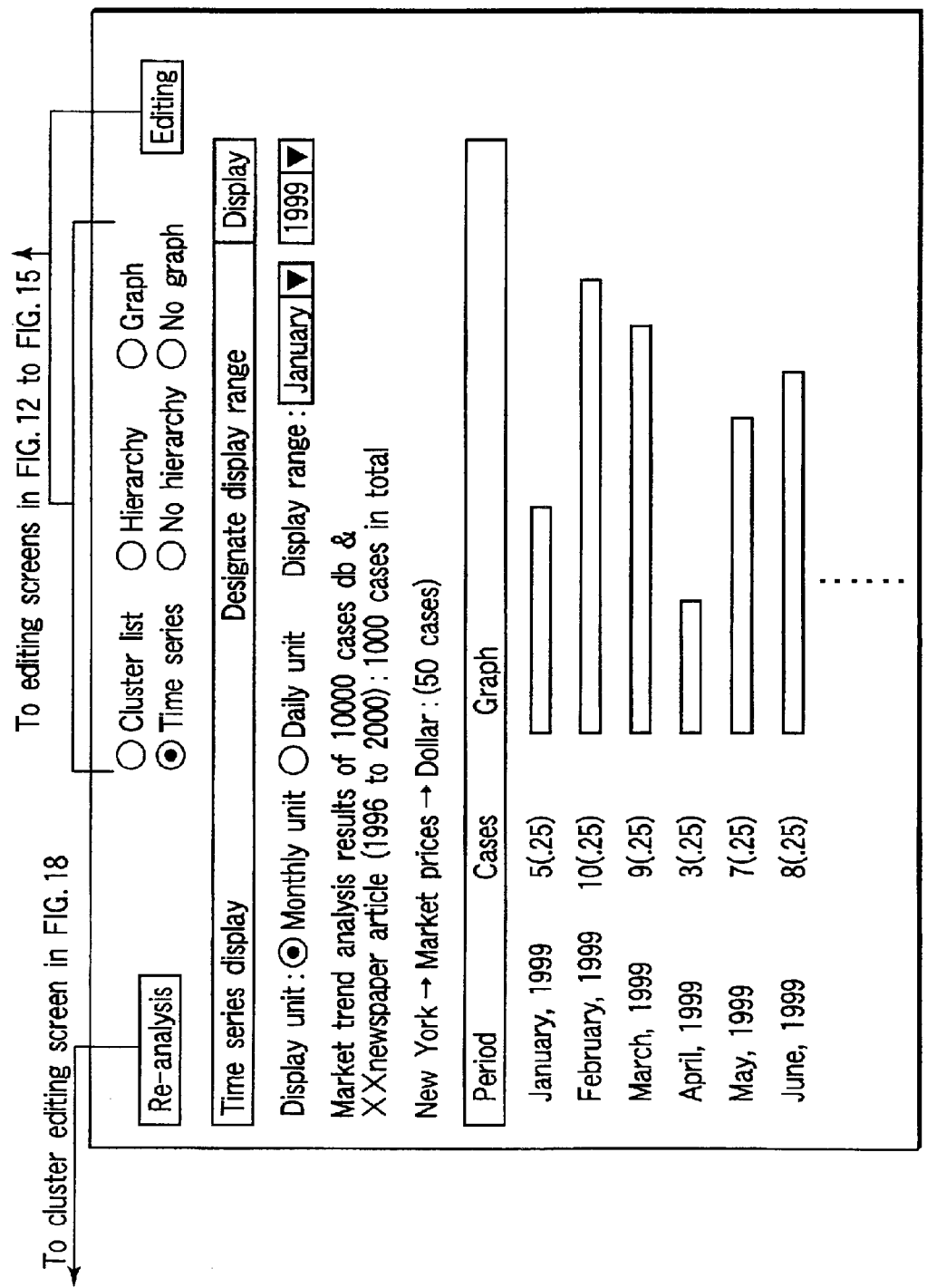
FIG. 16 is a diagram showing an example of time series display screen in which each of clusters is displayed in time series according to the embodiment.

FIG. 12 to FIG. 15 are diagrams showing a knowledge cluster list display screen. FIG. 16 is a diagram showing an example of each cluster time series display screen.

<Knowledge Cluster List Display>
(1) Non hierarchy display & Non graph display

Figure 12:
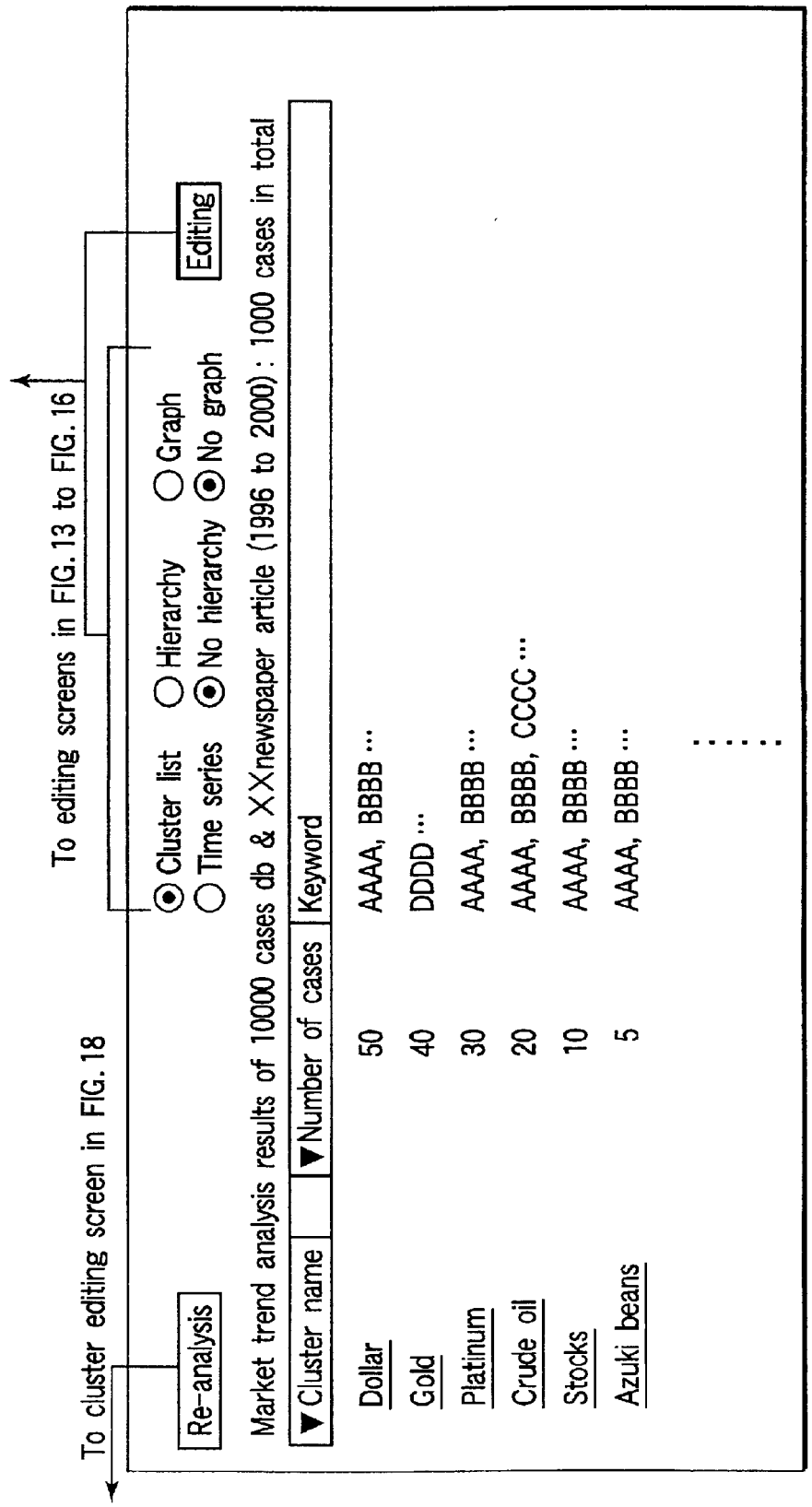
FIG. 12 is a diagram showing an example of a cluster list display screen (non hierarchy display & non graph display) according to the embodiment.

Display is made in the sequence of number of cases. FIG. 12 shows an example of a list of all clusters in sequence of number of cases. As shown in editing condition selection column in FIG. 12, as editing conditions, "Cluster list display", "Non hierarchy display", and "Non graph display" are selected. In FIG. 12, two kinds of display, i.e., list display of all clusters irrespective of hierarchy, and list display at a specific hierarchy (first hierarchy, second hierarchy, . . . , n-th hierarchy) may be selected. Explanations on the screen in FIG. 12 are made hereinafter.

Cluster name: Cluster names are displayed.
Number of cases: The number of knowledge pieces belonging to cluster is displayed.
Keyword: The keyword of the cluster is displayed.

Common to FIG. 12 to FIG. 16, when editing conditions are changed in editing condition selection column in these FIG. 12 to FIG. 16, and <Edit> is selected, thereby editing processing on the basis of the changed editing conditions is executed. As a result, the editing screen under the changed editing conditions is displayed.

(2) Non hierarchy display & Graph Display

FIG. 13 shows a screen displaying a list of all clusters irrespective of hierarchy. What is different from FIG. 12 is that there is a graph display in FIG. 13. Two kinds of display, i.e., list display of all clusters irrespective of hierarchy, and list display at a specific hierarchy may be selected. Explanations on the screen in FIG. 13 are made hereinafter.

Cluster name: Cluster names are displayed.
Number of cases: The number of knowledge pieces belonging to cluster is displayed.
Keyword: The keyword of the cluster is displayed.
Graph: The number of knowledge pieces is displayed in bar graph.

(3) Hierarchy Display & Non graph display

There are the following two methods for displaying hierarchical relations of all clusters:
(a) Display of entire hierarchy
(b) Display with hierarchy fixed and display with the hierarchy being ignored FIG. 14 shows an example of screen display of entire hierarchy. In FIG. 14, analysis results are displayed only in a hierarchical structure, and there is no graph display. Meanwhile, in the case of plural hierarchies, it is possible to limit the display so as to show only specified hierarchies or lower. Explanations on the screen in FIG. 14 are made hereinafter.

Cluster: Analyzed cluster and the keyword of the cluster are displayed in hierarchical structure.
Number of cases: The number of knowledge pieces below cluster is displayed.

(4) Hierarchy Display & Graph Display

There are the following two methods for displaying hierarchical relations of all clusters:
(a) Display of entire hierarchy
(b) Display with hierarchy fixed and display with the hierarchy being ignored FIG. 15 shows an example of screen display of entire hierarchy. In FIG. 15, analysis results are displayed in hierarchical structure and graph. Explanations on the screen in FIG. 15 are made hereinafter.

Cluster: Analyzed cluster and the keyword of the cluster are displayed in hierarchical structure.
Number of cases: The number of knowledge pieces below cluster is displayed.
Graph: The number of knowledge pieces is displayed in bar graph. The number is displayed in different color based on hierarchy.

<Time series Graph Display of Knowledge in Knowledge Cluster>

The number of knowledge pieces registered in knowledge cluster is displayed in graph in time series (based on each day or each month).

(1) Time series Analysis Display

The time series analysis display function is to display registered knowledge pieces below cluster in unit of month or day according to registered time information. Graph is not displayed at the start of screen. When the display unit and display range are designated and <Display> is selected, the graph of designated range is displayed. FIG. 16 shows an example of display in unit of month. Explanations on the screen in FIG. 16 are made hereinafter.

Unit of displaying: The unit to display graph is designated to either monthly unit or daily unit. If in default, "monthly unit" is designated.

Display range: The range of display is designated.

Graph display: In the case of monthly unit, the number of knowledge pieces of the designated year of display range are totaled in unit of month, and displayed in graph. At the moment, even if a numeric value is input in the item "month" of display range, it is not reflected on graph display. On the other hand, in the case of daily unit, the number of knowledge pieces which matches the designated month and year of display range are totaled in unit of day, and displayed in graph.

<Re-analysis Processing>

Figure 17:
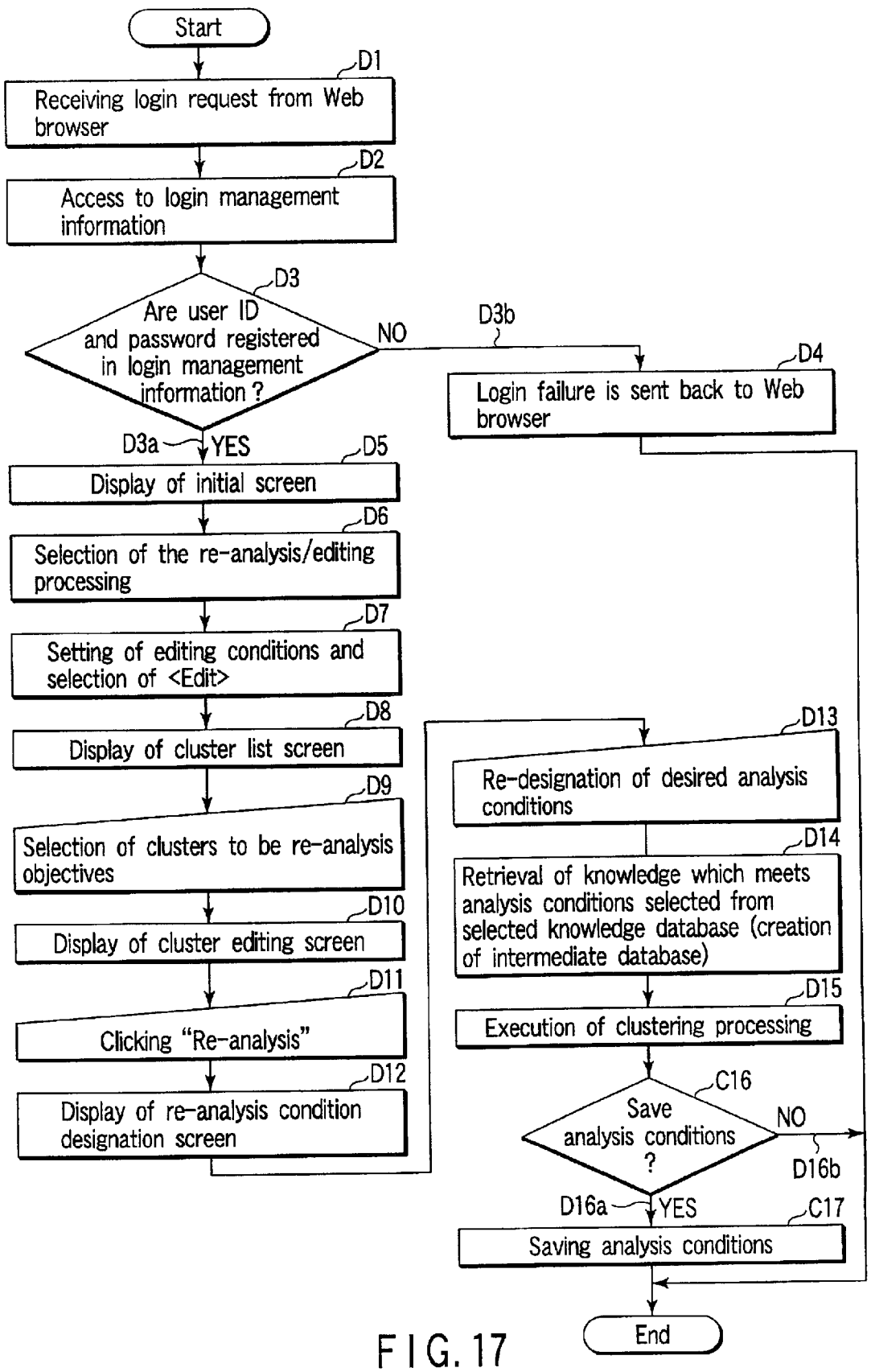
FIG. 17 is a flowchart showing procedures of a reanalysis processing method according to the embodiment.

In reference to the flowchart shown in FIG. 17, re-analysis processing method is explained hereinafter. FIG. 17 shows an example of the procedures of a process wherein, to the clusters selected in FIG. 12 to FIG. 16, the maximum number of the most significant clusters and either of important words, unnecessary words, and synonymous words are reset, and re-analysis is newly made. Re-analysis means a processing to carry out re-clustering and replace existing clusters with new clusters.

When a user requests login to the control module 1211 of the server computer 12 via Web browser 111 (D1), the control module 1211 accesses the login management information 1212, and checks whether or not the user ID and password input by the user are registered therein (D2). The control module 1211 carries out user authentication so as to determine whether or not the login is permitted (D3). If the user ID and password are not registered in the login management information 1212, and the login fails (D3*b*), the control module 1211 sends out data showing that the login has failed via the Web server 121 to the Web browser 111 and ends the processing (D4).

On the other hand, if the user ID and password are already registered in the login management information 1212, and the login succeeds (D3*a*), the clustering module 1223 of the knowledge server 122 makes the display screen of the client terminal 11 display the initial screen shown in FIG. 5 (D5). If the user selects "Re-analysis/editing processing" on the initial screen, the clustering module 1223 makes the display device of the client terminal 11 display the reanalysis/editing screen shown in FIG. 11 (D6). In the re-analysis/editing screen, editing conditions are set by the user, and when <Edit> is selected (D7), the clustering module 1223 makes the display device of the client terminal 11 display the editing screen according to the set editing conditions (D8). The editing screen may be as shown in FIG. 12 to FIG. 16, while in the example, explanations are made on the assumption that cluster list is set as an editing condition, and the cluster list screen shown in FIG. 14 is displayed.

When the cluster list screen is displayed, the user selects clusters to be re-analysis objectives on the screen and clicks <Select> button (D9). When the selection is made, the Web browser 111 sends cluster identification data to identify the selected clusters to the server computer 12, and requests for carrying out cluster editing. In response to the re-analysis request, the clustering module 1223 of the knowledge server 122 makes the display device of the client terminal 11 display the cluster editing screen shown in FIG. 18 (D10).

FIG. 18 is a diagram showing an example of cluster editing screen. In FIG. 18, cluster names to be objectives of re-analysis are selected. In FIG. 18, the following items are displayed.

Fixed: Whether cluster is a fixed or not is displayed. In the case of fixed cluster, even when re-analysis is carried out, the designated cluster and clusters of layers lower than the designated cluster are not changed. In the example in FIG. 18, the cluster "New York" is designated as the fixed cluster. Therefore, the cluster "New York", and the clusters of lower layers thereof "Market price" and "Dollar" are automatically designated as the fixed clusters. Fixation of clusters is executed by designating a fixed cluster and selecting <Fixed>, while non-fixation (release of fixation) is executed by designating a cluster to be released and selecting <Fixation release>.

Combination objective: Combination objectives (clusters) wherein two clusters or more are combined into one cluster or more are designated. In FIG. 18, an example is shown wherein clusters "Tokyo" and "Hong Kong" are combined into 1 cluster (tentative name "a"), and clusters "New York" and "London" are combined into one cluster (tentative name "b"). By the cluster combination, knowledge pieces separated into plural clusters are integrated into one cluster. In the example in FIG. 18, two combination objectives or more are checked, and <Combine> is selected, thereby cluster combination is set. Meanwhile, combination release as the reverse processing to combination is realized by re-clustering for cluster segmentation.

Cluster name: Cluster names are displayed.

Keyword: The keyword of the cluster is displayed.

Number of cases: The number of knowledge pieces belonging to cluster is displayed.

When the cluster editing screen is displayed, the user clicks <Re-analysis> button on the screen (D11). Thereby, the cluster name data showing selected cluster names is sent from the client terminal 11 to the server computer 12, and re-analysis request is made.

In response to the re-analysis request, the clustering module 1223 of the knowledge server 122 makes the client terminal 11 display the re-analysis condition designation screen shown in FIG. 19 (D12).

FIG. 19 is a diagram showing an example of a re-analysis condition designation screen. FIG. 19 is the screen for designating re-analysis conditions. Namely in FIG. 19, analysis conditions for re-analyzing clusters as the already-created analysis results and overwriting them are input. In FIG. 19, the following items are displayed. Meanwhile, each field of analysis conditions is displayed in status wherein parameters used in the previous analysis have been input. Among them, only the maximum number of the most significant clusters, important words, unnecessary words, and synonymous words may be changed in re-analysis.

Analysis objective DB: The name of knowledge database 1225 used for analysis is displayed.

Analysis result name: The name of analyzed result which is saved is displayed.

Analysis objective period: A period for analysis is displayed.

Focusing keyword: The word to be used as analysis keyword is displayed.

Number of focused cases: The maximum number of cases to be registered in analysis result is displayed.

Number of hierarchies: The number of hierarchies for clustering is displayed.

Overlap of knowledge: By the overlap of knowledge, it is designated whether to permit one knowledge piece to be registered in plural clusters in redundancy or not.

Maximum number of most significant clusters: The maximum number of clusters to be created in the most significant cluster is designated herein. In the case of no entry, clustering is carried out with no designation. The number may be changed.

Important word: An important word for analysis is entered. In the case of entering plural words, space between words is made.

Unnecessary word: An unnecessary word for analysis is entered. In the case of entering plural words, space between words is made.

Synonymous word: A synonymous word for analysis is entered Synonyms are entered with "=" in between them. Defined synonyms are separated with each other by semicolon (;). Three synonyms or more may be defined for one item. Defined synonyms are collected into the word to be described at the most left in analysis result.

The user adds newly, for example, "Financial restoration" and "Bad loans" as important words on the re-analysis condition designation screen as shown in FIG. 19, and changes the maximum number of the most significant clusters from "20" to "30", and clicks <Enter> button (D13).

When these analysis conditions are re-designated, the retrieval module 1222 of the knowledge server 122 carries out retrieval using the important word, unnecessary word, and synonymous word, and thereby creates intermediate database 1226 (D14). The clustering module 1223 of the knowledge server 122 executes clustering processing on the basis of the conditions concerning clustering designated in FIG. 19 (D15). Clustering processing results are automatically saved as knowledge cluster groups into the analysis result database 1227.

Thereafter, when <Save analysis condition> is selected on the analysis condition designation screen (D16a), the analysis condition saving screen shown in FIG. 8 is displayed. When <Enter> is selected on the analysis condition saving screen, the analysis conditions are saved in relation with analysis results into the analysis result database 1227 (D17). When analysis conditions are saved, the new analysis processing is complete. On the other hand, when analysis conditions are not saved, <End> is selected on the analysis condition designation screen (D16b). Thereby, the re-analysis processing is complete.

As described heretofore, the knowledge analysis system according to the present embodiment comprises a mechanism which sets important words to create the axis of cluster, unnecessary words and synonymous words for clustering in combination with the important words. By the mechanism, it is possible to execute classification by categorization and hierarchy that a user intends, without being influenced by bias in contents of knowledge groups accumulated at clustering.

Further, it is possible to store analysis conditions at execution of clustering, and call the saved analysis conditions, and if required, reset the important words, unnecessary words and synonymous words and execute re-clustering. By the re-clustering, it is possible to obtain far more precise analysis, and to significantly improve operability and efficiency of re-analysis.

The present invention is not limited to the embodiment, and the invention may be variously modified without departing from the spirit or essential characteristics thereof.

For example, in the present embodiment, a case wherein data communications between the client terminal 11 and the server computer 12 is made as one structural factor thereof, but the invention is not limited to only this. The knowledge analysis method may be employed in a standalone computer. In this case, a structure corresponding to the client terminal 11 is assembled in a structure corresponding to the server computer 12 in the above embodiment. Thereby, it is possible to carry out knowledge analysis without necessity of data communications. As a consequence, it is confirmed that the present specification includes the invention shown below.

A knowledge analysis system which supports analysis to knowledge accumulated in knowledge database, comprising: access control means for conducting user authentication of a user requesting for access for permitting knowledge analysis, and knowledge analysis means for clustering knowledge accumulated in the knowledge database to classify each of the knowledge into clusters defined based on category, and thereby creating cluster database, wherein the knowledge analysis means has means for setting important words having priority in clustering at creation of the cluster database, and carries out clustering so that an axis of cluster is created on the basis of the important words.

Further, it may be well understood by those skilled in the art that the present embodiment mentioned above includes various steps of inventions, and by appropriate combinations of plural structural elements disclosed therein, it is possible to extract various inventions. For example, even when some structural elements are deleted from all the elements shown in the embodiments, if the problem mentioned in the section as to the problems to be solved by the present invention can be solved, and the advantageous effects mentioned in the present embodiment are obtained, the structure wherein these structural elements are removed may be extracted as a part of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A knowledge analysis system configured to be connectable to plural client terminals via a network, which supports analysis requested by each of the client terminals to knowledge accumulated in a knowledge database, comprising:

access control means for conducting user authentication to a client terminal requesting an access for permitting knowledge analysis from the client terminal; and knowledge analysis means for clustering knowledge accumulated in the knowledge database to create a cluster database in which each knowledge is classified into clusters defined based on category, wherein the knowledge analysis means has means for setting important words having priority in clustering at creation of the cluster database, and carrying out clustering to create an axis of cluster on the basis of the important words, and has means for storing analysis conditions used at creation of the cluster database.

2. A knowledge analysis system according to claim 1, wherein the knowledge analysis means has means for reading the stored analysis conditions, and creating a new cluster database by use of analysis conditions which are changed from the stored analysis conditions.

3. A knowledge analysis system configured to be connectable to plural client terminals via a network, which supports analysis requested by each of the client terminals to knowledge accumulated in a knowledge database, comprising:

access control means for conducting user authentication to a client temiinal requesting an access for permitting knowledge analysis from the client terminal; and knowledge analysis means for clustering knowledge accumulated in the knowledge database to create a cluster database in which each knowledge is classified into dusters defined based on category; wherein the knowledge analysis means has means for setting important words having priority in clustering at creation of the cluster database, and carrying out clustering to create an axis of cluster on the basis of the important words, and the knowledge analysis means has means for creating a cluster database from the knowledge accumulated in the knowledge database on the basis of analysis conditions including important words, unnecessary words and synonymous words, and re-analysis means for obtaining re-analysis conditions, and carrying out clustering once again by use of the re-analysis conditions in which at least one of a set of the important words, a set of the unnecessary words and a set of the synonymous words are reset from the analysis conditions to recreate the cluster database and to replace the already-created cluster database.

4. A knowledge analysis system according to claim 3, wherein the re-analysis means further comprises cluster setting means for prompting the client terminal to set to-be-recreated clusters of the clusters contained in the already-created cluster database, and carrying out the re-clustering on the clusters set by the client terminal.

5. A knowledge analysis system configured to be connectable to plural client terminals via a network, which supports analysis requested by each of the client terminals to knowledge accumulated in a knowledge database, comprising:

access control means for conducting user authentication to a client terminal requesting an access for permitting knowledge analysis from the client terminal; and knowledge analysis means for clustering knowledge accumulated in the knowledge database to create a cluster database in which each knowledge is classified into clusters defined based on category; wherein the knowledge analysis means has means for setting important words having priority in clustering at creation of the cluster database, and carrying out clustering to create an axis of cluster on the basis of the important words, and wherein in the clustering, the knowledge analysis means determines a hierarchical structure defining hierarchical relation of one knowledge and another knowledge, and also determines clusters to which the one knowledge and the another knowledge belong.

6. A knowledge analysis system configured to be connectable to plural client terminals via a network, which supports analysis requested by each of the client terminals to knowledge accumulated in a knowledge database, comprising:

access control means for conducting user authentication to a client terminal requesting for access for permitting knowledge analysis from the client terminal; and knowledge analysis means for clustering knowledge accumulated in the knowledge database to create a cluster database in which each knowledge is classified into clusters defined based on category; wherein the knowledge analysis means has means for setting important words having priority in clustering at creation of the cluster database, and carrying out clustering to create an axis of cluster on the basis of the important words, and the knowledge analysis means prompts a user to input clustering conditions including at least one of an analysis result name, an analysis objective period, a focusing keyword, a number of focused cases, a number of hierarchies of hierarchical structure defining hierarchical relation of one knowledge and another knowledge, a presence or absence of redundancy of knowledge, and a number of most significant clusters to carry out clustering on the basis of the input clustering conditions.

7. A knowledge analysis system configured to be connectable to plural client terminals via a network, which supports analysis requested by each of the client terminals to knowledge accumulated in a knowledge database, comprising:

access control means for conducting user authentication to a client terminal requesting an access for permitting knowledge analysis from the client terminal; and knowledge analysis means for clustering knowledge accumulated in the knowledge database to create a cluster database in which each knowledge is classified into clusters defined based on category; wherein the knowledge analysis means has means for setting important words having priority in clustering at creation of the cluster database, and carrying out clustering to create an axis of cluster on the basis of the important words, and editing processing means for editing the already-created cluster database and making the client terminal display an edited cluster database, and the editing processing means prompts the client terminal to input editing conditions including a presence or absence of at least one of a cluster list display, a time series display, a hierarchical structure display, and a graph display, and edits the cluster database on the basis of the editing conditions input by the client terminal, and makes the client terminal display an editing processing result including at least one of the cluster list display, the time series display, the hierarchical structure display, and the graph display.

8. A knowledge analysis method for supporting analysis requested from plural client terminals to knowledge accumulated in a knowledge database, comprising:

conducting user authentication to a client terminal requesting an access for permitting knowledge analysis from the client terminal;

clustering knowledge accumulated in the knowledge database to create a cluster database in which each knowledge is classified into clusters defined based on category; in the creation of the cluster database, important words having priority in clustering being set to create an axis of cluster on the basis of the important words;

at creation of the cluster database, creating the cluster database from the knowledge accumulated in the knowledge database on the basis of analysis conditions including important words, unnecessary words and synonymous words, and obtaining re-analysis conditions, and carrying out clustering once again by use of the re-analysis conditions in which at least one of a set of the important words, a set of the unnecessary words and a set of the synonymous words are reset from the analysis conditions to recreate the cluster database and to replace the already-created cluster database.

9. A knowledge analysis method for supporting analysis requested from plural client terminals to knowledge accumulated in a knowledge database, comprising:

conducting user authentication to a client terminal requesting an access for permitting knowledge analysis from the client terminal;

clustering the knowledge accumulated in the knowledge database to create a cluster database in which each knowledge is classified into clusters defined based on category; in the creation of the duster database, important words having priority in clustering being set to create an axis of cluster on the basis of the important words; and wherein in the clustering, a hierarchical structure defining hierarchical relation of one knowledge and another knowledge is determined, and clusters to which the one knowledge and the another knowledge belong are determined.

10. A knowledge analysis method for supporting analysis requested from plural client terminals to knowledge accumulated in a knowledge database, comprising:

conducting user authentication to a client terminal requesting an access for permitting knowledge analysis from the client terminal;

clustering knowledge accumulated in the knowledge database to create a cluster database in which each knowledge is classified into clusters defined based on category; in the creation of the cluster database, important words having priority in clustering being set to create an axis of cluster on the basis of the important words;

prompting the client terminal to input editing conditions including a presence or absence of at least one of a cluster list display, a time series display, a hierarchical structure display, and a graph display; and editing the already-created cluster database on the basis of the editing conditions input by the client terminal to make the client terminal display an editing processing result including at least one of the cluster list display, the time series display, the hierarchical structure display, and the graph display.

11. A knowledge analysis program product which supports a computer system for analyzing knowledge accumulated in a knowledge database, comprising:

a recording medium;

a first program code which is recorded in the recording medium to assign the computer system a command to carry out user authentication to a client terminal requesting an access for permitting knowledge analysis from the client terminal;

a second program code which is recorded in the recording medium to assign the computer system a command to create a cluster database used for knowledge analysis from each terminal whose access is permitted, for classifying each knowledge accumulated in the knowledge database into clusters defined based on category;

a third program code which is recorded in the recording medium to assign the computer system a command to carry out analysis condition setting procedures to set important words having priority in clustering, unnecessary words to be ignored in clustering, and synonyms to be handled as synonymous words in clustering, at creation of the cluster database; and a fourth program code which is recorded in the recording medium to assign the computer system a command to carry out analysis condition saving procedures to save the analysis conditions used at creation of the cluster database.

12. A knowledge analysis program product according to claim 11, further comprising:

a fifth program code which is recorded in the recording medium to assign to the computer system a command to create the cluster database from the knowledge accumulated in the knowledge data on the basis of analysis conditions of important words and unnecessary words and synonymous words, and a sixth program code which is recorded in the recording medium to assign to the computer system a command to obtain the analysis conditions used at creation of the cluster database and to re-create the cluster database by use of re-analysis conditions after at least one of a set of the important words, a set of the unnecessary words and a set of the synonymous words is reset from the analysis conditions and replace the already-created cluster database.

* * * * *

UNITED STATES PATENT AND TRADEMARK OFFICE
CERTIFICATE OF CORRECTION

PATENT NO. : 6,895,397 B2
DATED : May 17, 2005
INVENTOR(S) : Nagamura et al.

It is certified that error appears in the above-identified patent and that said Letters Patent is hereby corrected as shown below:

Column 21,
Line 2, change "temiinal" to -- terminal --.
Line 7, change "dusters" to -- clusters --.

Column 23,
Line 7, change "duster" to -- cluster --.

Signed and Sealed this

Ninth Day of August, 2005

JON W. DUDAS
*Director of the United States Patent and Trademark Office*